US009208763B2

(12) United States Patent  (10) Patent No.: US 9,208,763 B2
Avitabile et al.  (45) Date of Patent: Dec. 8, 2015

(54) METHOD, APPARATUS AND SOFTWARE FOR PROVIDING USER FEEDBACK

(71) Applicants: Sony Corporation, Minato-ku (JP); Sony Europe Limited, Weybridge (GB)

(72) Inventors: Antonio Avitabile, Upper Froyle (GB); Xiaoming Chen, Basingstoke (GB)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 0 days.

(21) Appl. No.: 14/268,324

(22) Filed: May 2, 2014

(65) Prior Publication Data

US 2015/0027297 A1   Jan. 29, 2015

(30) Foreign Application Priority Data

Jul. 26, 2013 (GB) .................................. 1313391.3

(51) Int. Cl.
| | |
|---|---|
| *G10H 1/18* | (2006.01) |
| *G10H 1/36* | (2006.01) |
| *G01B 11/14* | (2006.01) |
| *G01L 1/10* | (2006.01) |
| *G09B 15/06* | (2006.01) |
| *G09B 15/00* | (2006.01) |
| *G01L 5/16* | (2006.01) |

(52) U.S. Cl.
CPC .................. *G10H 1/18* (2013.01); *G01B 11/14* (2013.01); *G01L 1/10* (2013.01); *G01L 5/16* (2013.01); *G09B 15/003* (2013.01); *G09B 15/06* (2013.01); *G10H 1/368* (2013.01)

(58) Field of Classification Search
USPC ........................................................ 84/615
IPC .............................................. G10H 1/18,1/368
See application file for complete search history.

(56) References Cited

U.S. PATENT DOCUMENTS

| | | | | |
|---|---|---|---|---|
| 3,662,641 | A | * | 5/1972 | Allen et al. ...................... 84/722 |
| 4,336,734 | A | * | 6/1982 | Polson ............................. 84/646 |
| 4,570,521 | A | * | 2/1986 | Fox .................................. 84/653 |
| 4,580,479 | A | * | 4/1986 | Bonanno ......................... 84/626 |
| 4,653,376 | A | * | 3/1987 | Allured et al. .................. 84/646 |

(Continued)

OTHER PUBLICATIONS

M. Hori, et al., "3-Axis Fingertip Force During Playing the String Instrument", Transducers and Eurosensors XXVII, Jun. 16-20, 2013, 4 pages.

(Continued)

*Primary Examiner* — David Warren
(74) *Attorney, Agent, or Firm* — Oblon, McClelland, Maier & Neustadt, L.L.P.

(57) ABSTRACT

A device for providing feedback to a user of a string instrument is described. The device comprises receiving circuitry operable in use to communicate with at least one finger sensor capable of detecting the force of a finger on a string, a camera operable in use to capture an image and a display operable in use to display data, wherein the receiving circuitry, camera and display are connected to processing circuitry which is operable to: detect, from the receiving circuitry, the force of a user's finger on at least one string at a given time; detect, from the camera, the position of the user's finger on the at least one string at the given time; compare the detected force of the user's finger and the position of the user's finger on the at least one string at the given time with a predetermined value of force and position at the given time; and generate, on the basis of the said comparison, feedback to display on the display.

17 Claims, 20 Drawing Sheets

(56) References Cited

U.S. PATENT DOCUMENTS

| | | | |
|---|---|---|---|
| 5,005,459 A * | 4/1991 | Adachi et al. | 84/453 |
| 5,033,351 A * | 7/1991 | Nomura | 84/646 |
| 5,140,887 A * | 8/1992 | Chapman | 84/646 |
| 5,602,356 A * | 2/1997 | Mohrbacher | 84/609 |
| 5,773,742 A * | 6/1998 | Eventoff et al. | 84/609 |
| 5,902,949 A * | 5/1999 | Mohrbacher | 84/609 |
| 6,084,167 A * | 7/2000 | Akimoto et al. | 84/477 R |
| 6,087,577 A * | 7/2000 | Yahata et al. | 84/478 |
| 6,350,942 B1 | 2/2002 | Thomson et al. | |
| 8,173,887 B2 * | 5/2012 | Sullivan | 84/724 |
| 8,242,345 B2 * | 8/2012 | Elion | 84/646 |
| 8,847,053 B2 * | 9/2014 | Humphrey et al. | 84/609 |
| 9,006,551 B2 * | 4/2015 | Iwase et al. | 84/615 |
| 2002/0148346 A1 * | 10/2002 | Okulov | 84/613 |
| 2003/0100965 A1 * | 5/2003 | Sitrick et al. | 700/83 |
| 2004/0046736 A1 * | 3/2004 | Pryor et al. | 345/156 |
| 2004/0237757 A1 * | 12/2004 | Alling | 84/601 |
| 2004/0244570 A1 * | 12/2004 | Ando | 84/744 |
| 2005/0183567 A1 * | 8/2005 | Aoki et al. | 84/722 |
| 2006/0032362 A1 * | 2/2006 | Reynolds et al. | 84/601 |
| 2006/0044280 A1 * | 3/2006 | Huddleston et al. | 345/173 |
| 2006/0107816 A1 * | 5/2006 | Vinoly et al. | 84/47 |
| 2006/0107826 A1 * | 5/2006 | Knapp et al. | 84/724 |
| 2008/0200224 A1 * | 8/2008 | Parks | 463/7 |
| 2009/0019990 A1 * | 1/2009 | Chien et al. | 84/478 |
| 2009/0100988 A1 * | 4/2009 | Villa et al. | 84/601 |
| 2009/0114079 A1 * | 5/2009 | Egan | 84/477 R |
| 2009/0188371 A1 * | 7/2009 | Chiu et al. | 84/314 R |
| 2011/0011241 A1 | 1/2011 | Bartos | |
| 2011/0023691 A1 * | 2/2011 | Iwase et al. | 84/612 |
| 2011/0132181 A1 * | 6/2011 | Kockovic | 84/723 |
| 2011/0146476 A1 * | 6/2011 | Zimmerman | 84/470 R |
| 2011/0207513 A1 * | 8/2011 | Cross et al. | 463/7 |
| 2011/0218022 A1 * | 9/2011 | Chiu et al. | 463/7 |
| 2013/0118339 A1 * | 5/2013 | Lee et al. | 84/725 |
| 2013/0228062 A1 * | 9/2013 | Tabata | 84/602 |
| 2013/0239780 A1 * | 9/2013 | Tabata | 84/602 |
| 2013/0239784 A1 * | 9/2013 | Tabata | 84/609 |
| 2013/0239785 A1 * | 9/2013 | Tabata | 84/609 |
| 2014/0251114 A1 * | 9/2014 | Yoshikawa | 84/478 |
| 2015/0027297 A1 * | 1/2015 | Avitabile et al. | 84/470 R |
| 2015/0059556 A1 * | 3/2015 | Grafman et al. | 84/485 R |

OTHER PUBLICATIONS

Tobias Grosshauser, et al., "Finger Position and Pressure Sensing Techniques for String and Keyboard Instruments", NIME'13, May 27-30, 2013, 6 pages.

* cited by examiner

| Time (s) | Professional Position (string, fret) | User Position (string, fret) | Error |
|---|---|---|---|
| 0.01 | (100000, 7) | (100000, 7) | 0 |
| 0.10 | (011000, 5) | (011000, 6) | 1 |
| 0.25 | (000100, 3) | (000010, 2) | 2 |

702 — Professional Position (string, fret)
704 — User Position (string, fret)
706 — Error

METHOD, APPARATUS AND SOFTWARE FOR PROVIDING USER FEEDBACK

CROSS REFERENCE TO RELATED APPLICATIONS

The present application claims priority to United Kingdom Application 1313391.3 filed on 26, Jul. 2013 the contents of which being incorporated herein by reference in its entirety.

BACKGROUND

1. Field of the Disclosure

The present disclosure relates to a method, apparatus and system for learning to play a musical instrument.

2. Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Learning to play a musical instrument has historically taken place either by a player learning via traditional music materials such as music books or by being taught by someone who already knows how to play (or, indeed, a combination of these methods). The problem with these methods, however, is that music books offer no interaction with the user, and thus the user is required simply to persevere with any problems that they encounter. Also, if a user wishes to learn from somebody else, they will generally have to pay for tuition, which can be very costly.

In recent years, however, with the development of computers and the internet, it has been possible for people to learn to play a musical instrument by following virtual lessons. These virtual lessons can be bought on disc (such as a CD-ROM or DVD-ROM) or can be downloaded or streamed from the internet (from YouTube®, for example). These virtual lessons can include videos and interactive software applications to help the player learn.

The problem, however, is that the virtual lessons available today tend to constitute only one-sided tuition. The user is able to learn from and possibly interact with the video/software application. However, they receive no direct feedback on the way in which they are performing with the instrument. The present disclosure helps to address these issues.

SUMMARY

In the disclosure there is described a method of providing feedback to a user of a string instrument, comprising the steps: detecting the force of a user's finger on at least one string at a given time; detecting the position of the user's finger on the at least one string at the given time; comparing the detected force of the user's finger and the position of the user's finger on the at least one string at the given time with a predetermined value of force and position at the given time; and generating feedback to display to the user on the basis of the said comparison.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 shows a first correlation function comparison method according to embodiments of the present disclosure;

DESCRIPTION OF THE EMBODIMENTS

Figure 1:
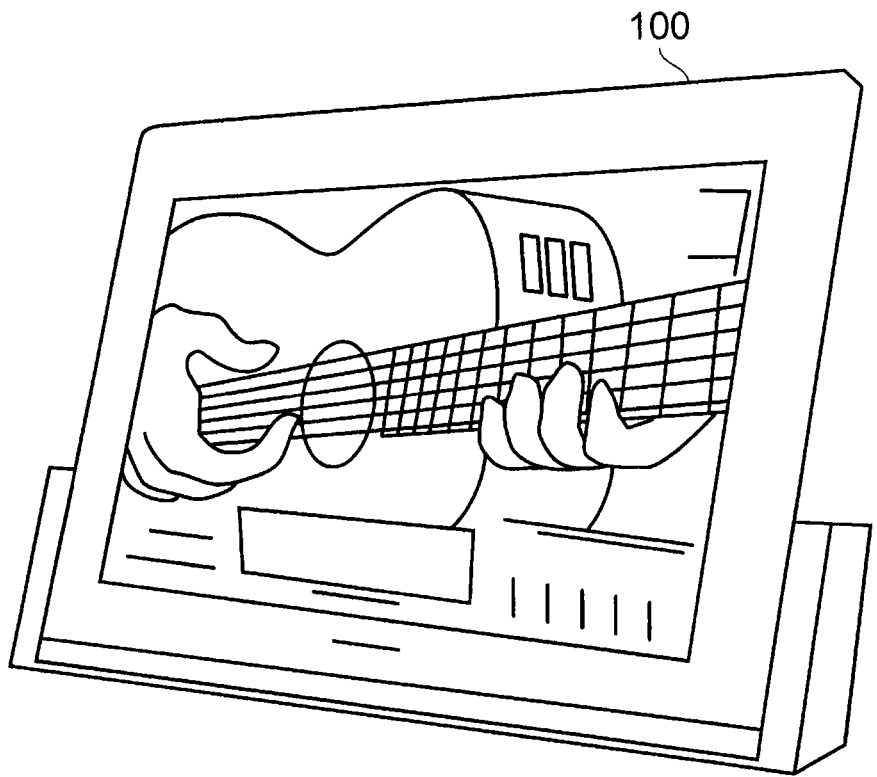
FIG. 1 shows a system according to an embodiment of the present disclosure.
Figure 1:
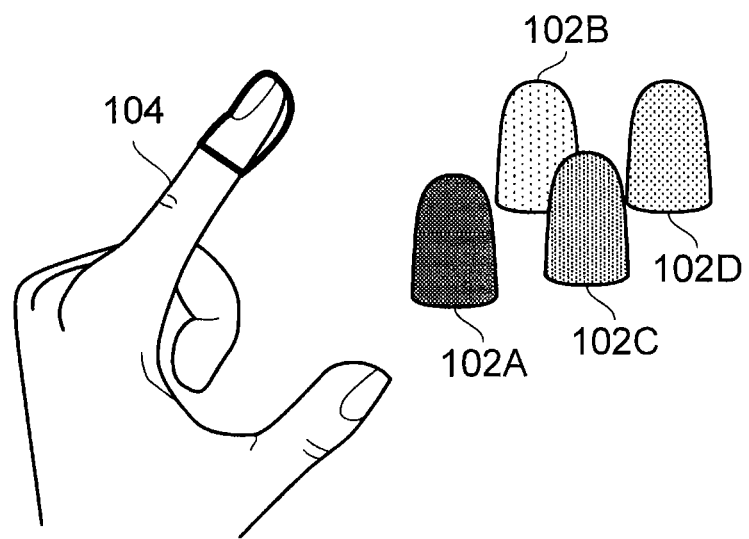

Referring now to the drawings, wherein like reference numerals designate identical or corresponding parts throughout the several views.

FIG. 1 shows a system according to an embodiment of the present disclosure. Included in the system are a tablet computer 100 (hereinafter referred to as a tablet) and a plurality of finger tip sensors 102A-D which can each be worn on a finger 104 of a user. Each of the finger tip sensors 102A-D are a different colour. As will be explained later, the tablet 100 is operable to run software which provides musical instrument tuition to the user. The tablet is able to receive information transmitted from the finger tip sensors 102A-102D when they are worn by the user as the user is playing a musical instrument, and the software is then able to provide feedback to the user about how they can improve their performance.

Figure 2:
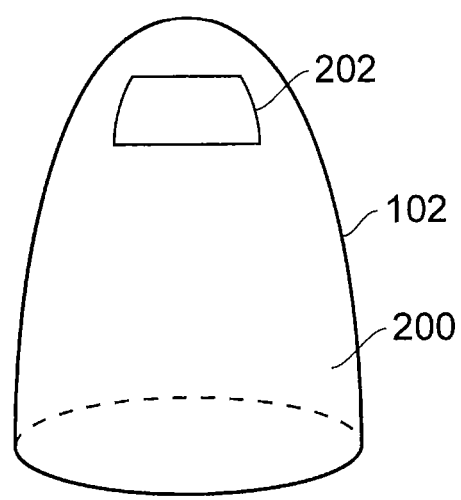
FIG. 2 shows a finger tip sensor according to an embodiment of the present disclosure.

FIG. 2 shows a finger tip sensor 102 according to an embodiment of the disclosure. The finger tip sensor includes a finger tip casing 200 into which a finger of the user can be inserted and a 3-axis tactile sensor unit 202. The finger tip casing can be constructed from any suitable material which is comfortable for the user to wear and which does not inhibit the user's ability to play a musical instrument. For example, the casing 200 could be made from silicone rubber. As will be explained later, the 3-axis tactile sensor unit is for detecting the force applied by the user by the finger on which the finger tip sensor 102 is worn as the instrument is played, and for transmitting this force information to the tablet 100. A suitable finger sensor is described in a paper by M. Hori et. al "3-Axis Fingertip Force During Playing the String Instrument", Transducers 2013, Barcelona, Spain 16-20 Jun. 2013. The contents of this paper is incorporated in its entirety by reference.

In embodiments, the instrument played by the user is a string instrument, such as guitar. Thus, the force measured by the 3-axis tactile sensor unit will be the force exerted on a string of the guitar by the user as the user pushes the string to make contact with the fret board to play a note with the guitar. It will, however, be appreciated that any instrument for which the user makes notes by pressing a part of the instrument with their finger could be used with embodiments of the present disclosure.

Figure 3:
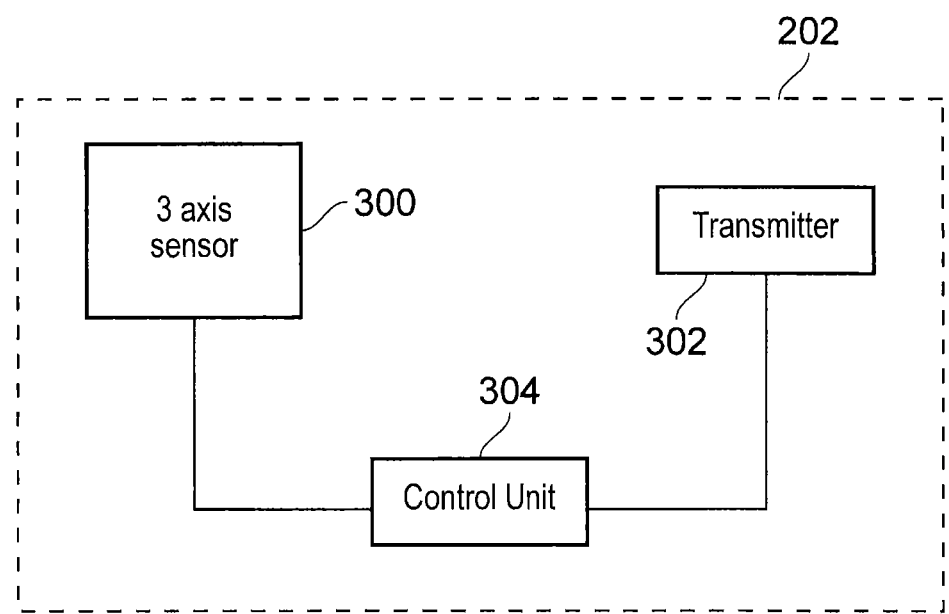
FIG. 3 shows a 3-axis tactile sensor unit according to an embodiment of the present disclosure.

FIG. 3 shows an embodiment of the 3-axis tactile sensor unit 202 in more detail. It can be seen that the sensor unit comprises a 3-axis tactile sensor 300, a transmitter 302 and a control unit 304. The 3-axis tactile sensor is able to measure the force exerted on it (and thus the force exerted by a finger of the user when the finger tip sensor 102 is worn by the user) in 3 dimensions. The transmitter 302 is then able to transmit data of the force and the frequency of that force measured by the 3-axis tactile sensor to the tablet 100. The transmitted 302 may be of any suitable wired or wireless type. For example, the transmitter 302 may transmit the force data via a Wi-Fi, Bluetooth, radio frequency (RF) or infrared (IR) connection with the tablet 100. The control unit 304 manages the transfer of data between the 3-axis tactile sensor 300 and the transmitter 302.

Figure 4:
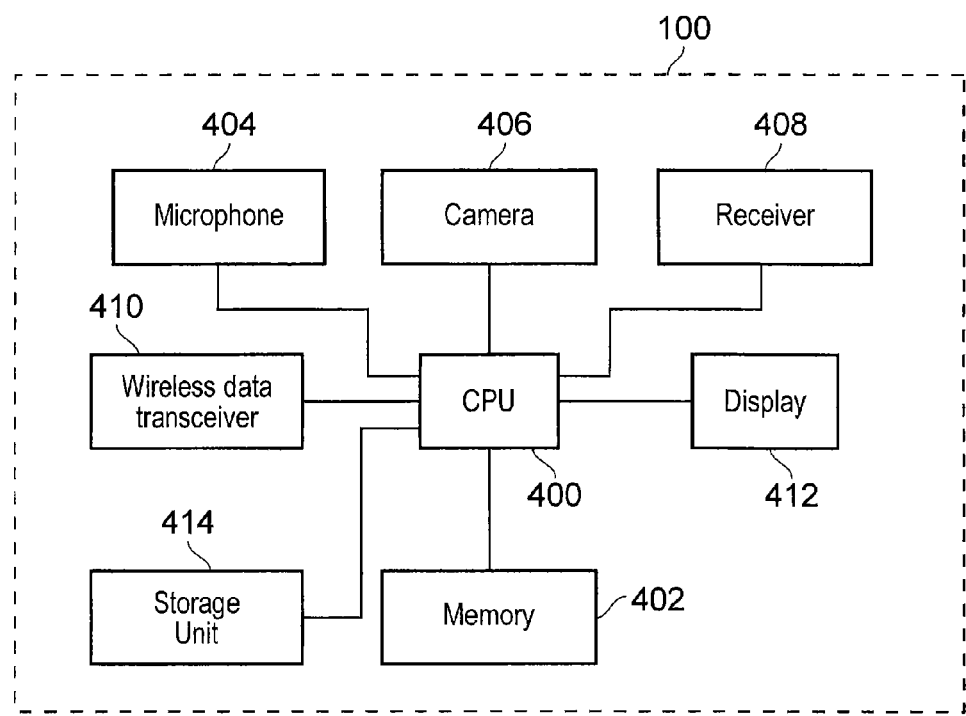
FIG. 4 shows a tablet computer on which embodiments of the present disclosure can be implemented.

FIG. 4 shows an embodiment of the tablet 100 in more detail. It can be seen that the tablet 100 comprises a central processing unit (CPU) 400, a memory 402 and a storage unit 414. The storage unit may comprise any suitable medium for storing electronic data, such as a flash memory unit or hard disk drive (HDD). The software application for providing the interactive musical tuition to the user is stored in the storage unit 414 and is executed by the CPU 400 when an instruction is received from the user to run the software application.

The tablet 100 also comprises a microphone 404 for receiving audio data, a camera 406 for receiving image data and a receiver 408 for receiving the force data transmitted by the transmitter 302 of the finger tip sensor 102. As will be discussed later, the musical tuition software application may use at least one of the audio data, image data and force data received by the tablet for providing feedback to the user on their performance with the musical instrument.

The tablet also comprises a display 412 for displaying information to the user and a wireless data transceiver 410 for connecting to a network (such as the internet). The wireless data transceiver may, for example, be a Wi-Fi or wireless mobile network transceiver. It is noted that, in embodiments where the force data is transmitted from the finger tip sensor 102 to the tablet 100 over a wireless network such as a Wi-Fi network, the separate receiver 408 in the tablet 100 may be omitted and the force data may be received via the wireless data transceiver 410 instead. In this case, the wireless data transceiver acts as the receiver 408.

Figure 5:
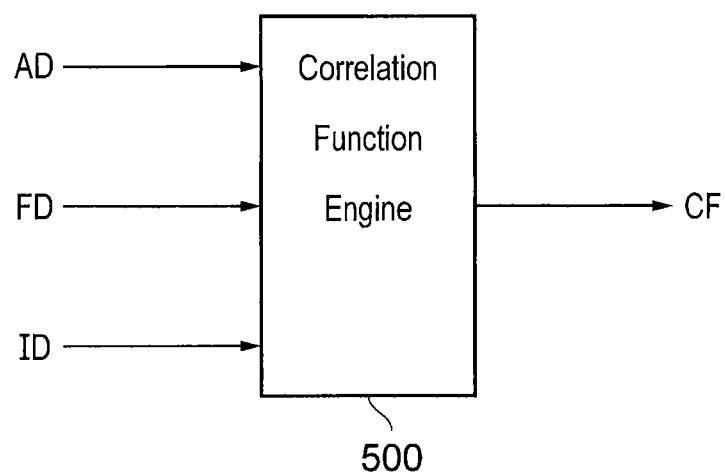
FIG. 5 schematically illustrates the inputs and outputs a correlation function engine according to an embodiment of the present disclosure.

FIG. 5 schematically illustrates the inputs and outputs of the musical instrument tuition software application that is run by the tablet 100. The software application includes a correlation function engine 500 which converts the audio data AD, force data FD and/or image data ID received by the tablet 100 during a musical instrument performance into a correlation function CF represents the musical instrument performance and allows different musical instrument performances of a particular song to be compared with each other.

As will be explained later, a user is thus able to play a particular song and have their performance recorded as a user correlation function. The user correlation function can then be compared with a professional correlation function which has previously been recorded by a professional musician. By comparing the user and professional correlation functions, the user can see the areas of the performance in which they need to improve, so that their performance more accurately reflects that of the professional musician. Thus, unlike traditional electronic musical tuition, the user is advantageously able to obtain personalised feedback on their actual musical performance.

Figure 6A:
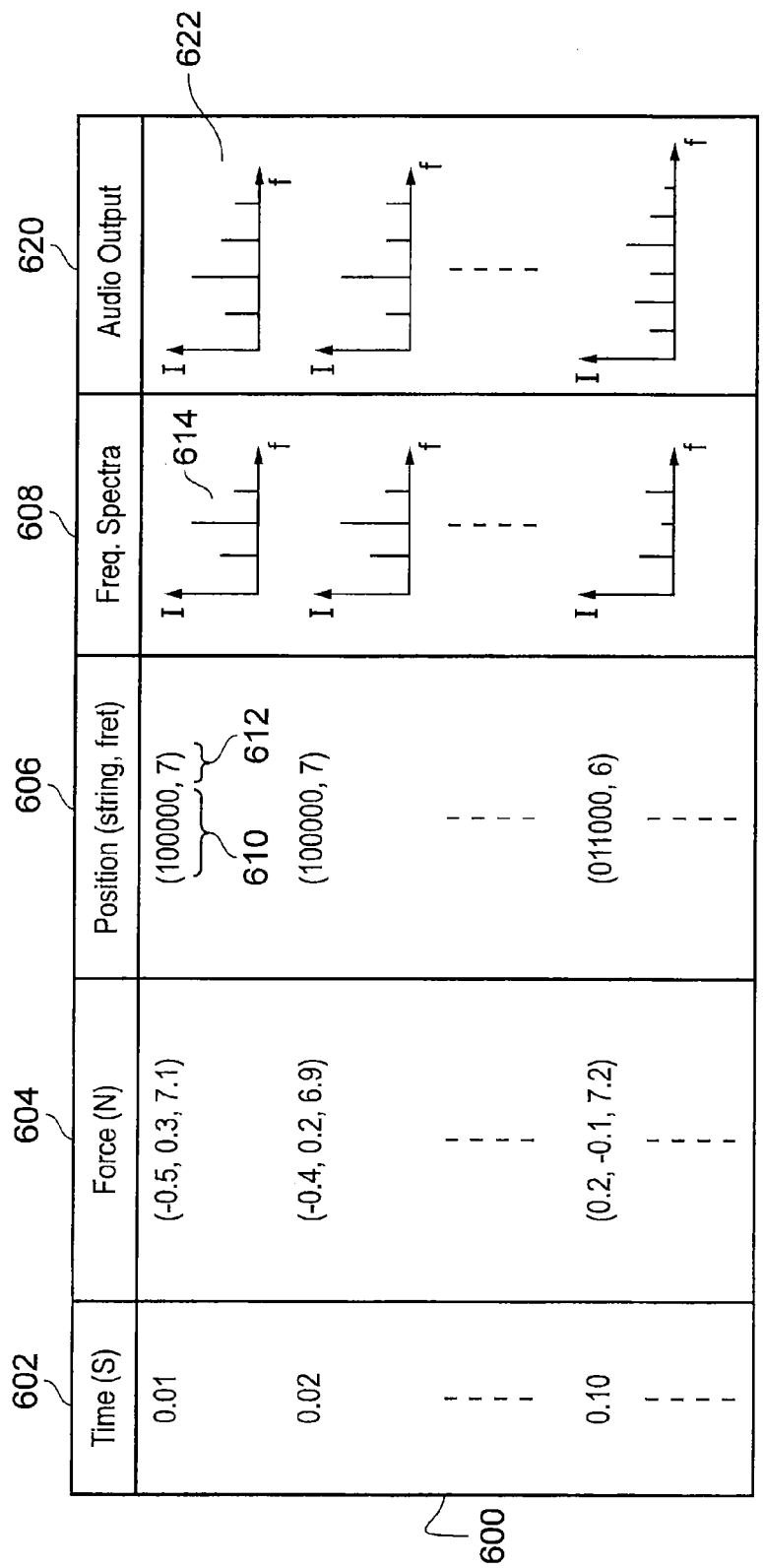
FIG. 6A shows an example of a correlation function CF according to an embodiment of the present disclosure.

FIG. 6A shows an example of a correlation function CF according to an embodiment of the present disclosure. The correlation function CF comprises a table 600 recording various parameters of the musical performance which have been obtained from the audio data AD, force data FD and/or image data ID received by the tablet 100. The table 600 includes four columns 602, 604, 606 and, 608 and is a table which relates to a single finger tip sensor 102 worn by the user. A further column 620 in the table 600 is included that relates to the sound received from the microphone 404 of the tablet. A separate table 600 will be generated for each finger tip sensor 102 worn by the user, and the combination of all the tables gives the correlation function CF.

Column 602 shows the time elapsed during the performance. Samples of the audio AD, force FD and/or image ID data will be captured at a predetermined sample rate, and the elapsed time during the performance each time a sample is captured will be recorded in column 602. In this example, a sample is captured at a rate of 100 samples per second, resulting in the elapsed performance time incrementing in 0.01 second intervals. However, it will be appreciated that any other suitable sample rate could be used. Such sample rates could be 22.6 μS (or a sampling frequency of 44.1 kHz which is the same as a regular compact disc). Other sample frequencies include 40 kHz for Human Hearing, 32 kHz for transmission-related application, or 48 kHz recommended by The Audio Engineering Society. A suitable sample rate should be such that the granularity of the performance is maintained in the correlation function CF.

Column 604 shows the force measured (in Newtons) and transmitted by the finger tip sensor 102 at the time in column 602. The force is measured and transmitted by the 3-axis tactile sensor unit 202 at the predetermined sample rate and is a 3-vector indicating the force in the x, y and z directions. In this case, the z direction refers to the direction in which the string of the guitar is pressed towards the fret board so as to change length of the vibrating part of the string and hence change the musical note. The majority of the force exerted by the user will thus be in the z direction. However, there may also usually be a smaller force in the x and y directions. These will be due to a shear force exerted by the user on the string as the string is pressed down.

Column 606 shows the position of the finger of the user on which the finger tip sensor 102 is worn. The position has two components, these being the one or more strings of the guitar which are pressed down by the user 610 and the number of the fret onto which the one or more strings are pressed 612. For ease of explanation here, the one or more strings pressed down are represented using a binary number, whereas the fret number (like all other numbers in table 600) is represented using a decimal number. It will be appreciated, however, that since this is a system implemented electronically, that all numbers will, in reality, be processed by the CPU 400 of the tablet 100 as binary numbers.

It can be seen that, for the first captured sample at time 0.01 seconds, the string position is given as "100000" and the fret position is given as "7". This means that a single string (the bass string of the guitar) has been recorded as being pressed down at fret 7. On the other hand, for the tenth sample captured at time 0.10 seconds, the string position is given as "011000" and the fret position is given as "6". This means that two strings (the $2^{nd}$ and $3^{rd}$ strings from the base string of the guitar) have been recorded as being pressed down at fret 6.

The position of the finger on which the finger tip sensor 102 is worn is detected from the image data ID captured by the camera 406 of the tablet 100 using any suitable image analysis method which is able to determine the position of the coloured finger tip sensor with respect to the marked frets of the guitar fret board and the sharp edges defined by the guitar strings. An example image analysis method is explained later with reference to FIGS. 6B-6D.

Column 608 shows a frequency spectrum 614 for each captured sample. This frequency spectrum can be obtained from the rapid force changes detectable by the 3-axis tactile sensor unit 202 as a string pressed by the user's finger vibrates (assuming that a finger tip sensor is worn on this finger), and by performing a Fourier transform.

Column 620 shows a frequency spectrum 622 for each captured sample. This frequency spectrum is the frequency spectrum of the sound received through the microphone 404. The sound received through the microphone 404 has a Fourier transform performed thereon. This may be used in combination with the frequency spectrum obtained in column 608.

In embodiments in which the frequency spectrum is obtained from the rapid force changes measured and transmitted by the 3-axis tactile sensor unit 202, this can be advantageous, because it allows the number of strings which are pressed down by the user to be easily determined.

This is possible because the harmonics of a single string, which are represented by peaks in the frequency spectrum, are multiples of the fundamental (first) harmonic. Thus, for a single string, the peaks in the frequency spectrum will be evenly spaced with respect to the frequency (f). However, for more than one string, there will be more than one fundamental harmonic (one for each string) and a set of associated further harmonics for each of those fundamental harmonics. Each set of further harmonics will comprise multiples the respective fundamental harmonic, thus resulting in peaks which are not evenly spaced but, rather, have a spacing which alternates between two or more values (depending on the number of strings pressed). The frequency spectrum captured at a particular sample can thus be analysed by the correlation engine 500 using any suitable method that more than one string has been pressed by the user.

It is noted that each of audio data AD, force data FD and/or image data ID captured by the tablet 100 can be used in combination in order to ensure that the table 600 is as accurate as possible.

For example, it has been discussed that the image data ID captured by the tablet 100 can be analysed so as to determine the position of a coloured finger tip sensor 102 worn by a finger of the user as they play a musical instrument such as a guitar. In this case, however, after performing the image analysis, the correlation function engine 500 may be unsure as to whether the user is actually pressing down a string or simply has their finger positioned above the string so that it appears, from the image data, that the string is being pressed down. In this case, the correlation function engine 500 will cross check with the force data for the sample in order to make a decision. So, for example, if the force in the z direction ($F_z$) is below a certain threshold value, then it will be determined that the user is not pressing down the string. On the other hand, if $F_z$ is above the certain threshold value, then it will be determined that the user is pressing down on the string.

Multiple thresholds could also be introduced. So, for example, if $F_z$ is below a first, lower threshold, then it is determined that the user is not pressing down on the string. On the other hand, if $F_z$ is above a second, higher threshold, then it is determined that the user is not pressing down on the string. However, if $F_z$ is between the first, lower threshold and the second, higher threshold, then it is determined that the user's finger is merely resting on the string, so as to produce a soft, harmonic sound with the guitar.

As another example, the position of a user's finger can be initially determined using the image data ID captured by the camera 406 in the tablet 100. However, if multiple strings have been pressed by the user's finger (as occurs, for example, when the user attempts a "barred chord"), then this may be difficult to detect purely from the image data. For example, it may be difficult to differentiate between whether the user is pressing down multiple strings, or whether the user is actually just pressing down a single string and has their finger stretched across the other strings (stretching across other strings is necessary, for example, when pressing down any string other than the highest pitched string of a guitar).

Thus, for a particular sample, the image data can be cross-referenced with the frequency spectrum in order to determine whether or not more than one string has been pressed down. More specifically, if only a single string has been pressed down, then there will be only one set of peaks in the frequency spectrum, with each peak being separated by a constant frequency difference. On the other hand, if more than one string has been pressed down, then there will be, accordingly, more than one set of peaks and more than one frequency difference between peaks.

Figure 6B:
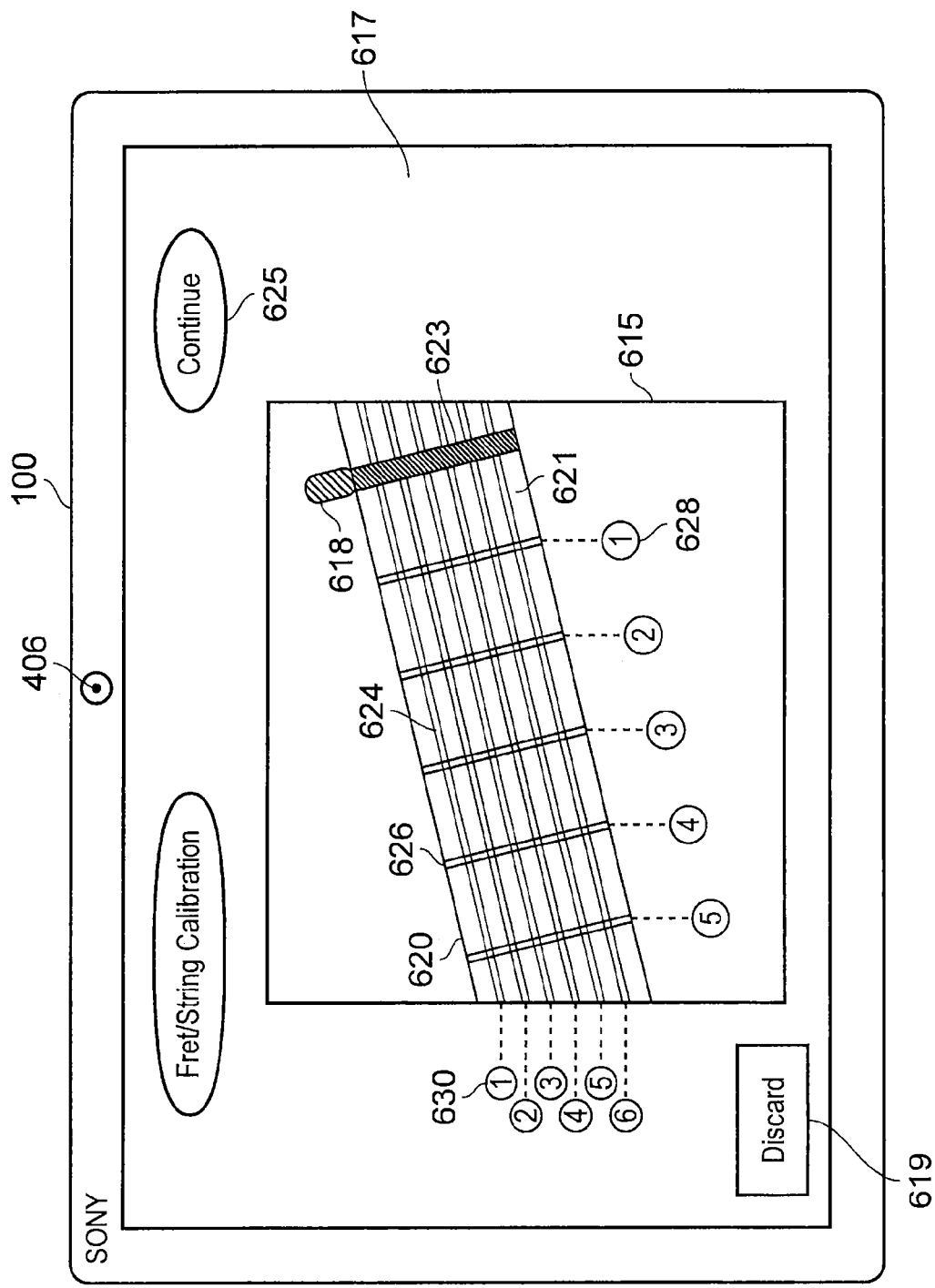
FIG. 6B shows a fret/string calibration procedure according to an embodiment of the present disclosure.
Figure 6C:
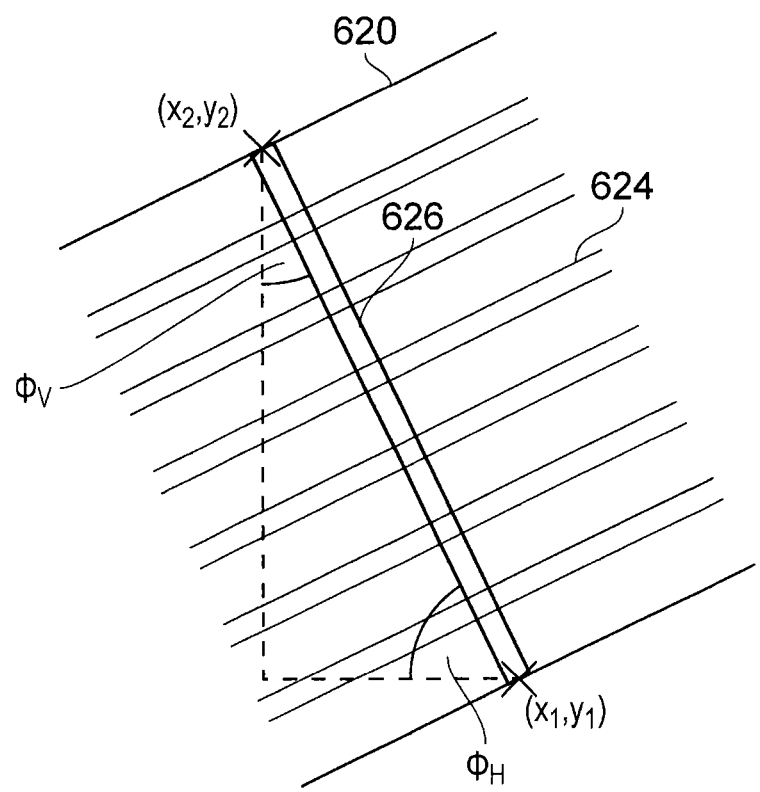
FIG. 6C shows a method for calculating the vertical and horizontal angles of frets/strings according to an embodiment of the present disclosure.
Figure 6D:
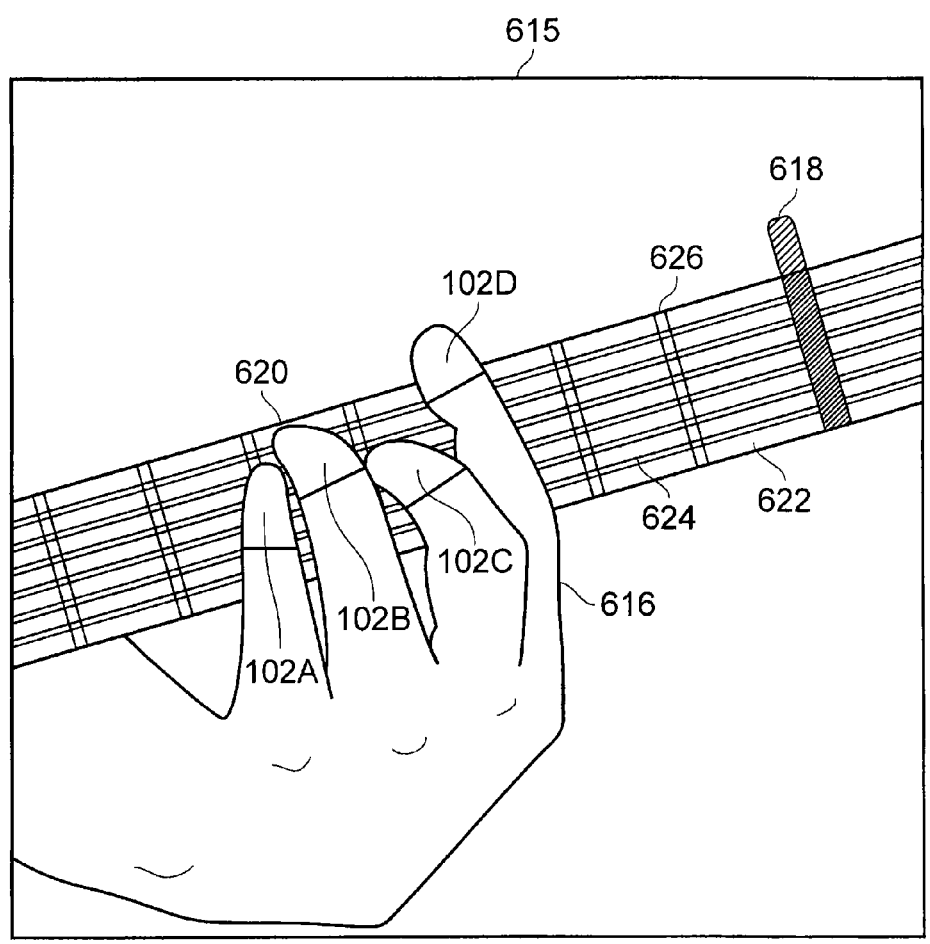
FIG. 6D shows a live image of a user playing the guitar whilst wearing a plurality of finger tip sensors.

FIGS. 6B-6D show, in more detail, how the correlation function exemplified by the table 600 is created for each finger sensor 102A-D.

As explained with reference to FIG. 6A, the correlation function engine 500 is able to use image data from the camera 406 of the tablet 600 to detect the positions of the finger sensors as the user plays a guitar. The finger sensor positions are determined with respect to the strings and frets of the guitar.

In order to facilitate accurate detection of the finger sensor positions, it must be ensured that the correlation function engine 500 can accurately determine the positions of the strings and frets of the guitar. Optionally, in embodiments, the string and fret positions are set during a calibration procedure by the user. The calibration procedure is carried out using a fret/string calibration screen 617 on the tablet 100, as shown in FIG. 6B.

On the calibration screen 617, there is shown a live image 615 of the user's guitar which is being captured by the camera 406 of the tablet 100. The user has positioned the tablet and guitar so that the fret board 620 of the guitar, including the first fret 621, can be seen by the camera.

In order for the correlation function engine 500 to determine the first fret of the guitar, a marker 618 has been positioned on the guitar by the user above the nut 623 of the guitar (the nut 623 defining the end of the fret board). This marker may be provided to the user at the same time as the purchase of the finger tip sensors, and includes a predetermined colouring and/or pattern which is easily detectable by the correlation function engine 500. The marker may be releasable fixed to the guitar using any suitable method.

Once the marker has been detected in the image 615, the correlation function engine 500 then performs an edge detection process on the image 615. The edge detection process can take place using any suitable method, such as Canny edge detection, Marr-Hildreth edge detection or a Hough transform. During the edge detection process, the sharp and well-defined appearance of the strings 624 and the fret bars 626 means that the strings and fret bars are detected as edges.

The correlation function engine 500 then decides which of the detected edges correspond to fret bars and which correspond to strings. This decision process can occur using any suitable method. For example, the correlation function engine 500 can decide that detected edges which are substantially parallel to a reference edge defined by the marker 618 (the marker 618 can be seen in the image 615 as extending away from the fret board 620, defining a reference edge) correspond to fret bars and that detected edges which are substantially perpendicular to the reference edge defined by the marker 618 correspond to strings.

The vertical and horizontal angles of each detected edge (including the reference edge) can be determined using the method shown in FIG. 6C, which shows a close-up of the fret board 620. Here, the detected edges of the guitar strings 624 and a fret bar 626 can be seen. An example of the angle calculation is shown for the edge defined by the fret bar 626.

In FIG. 6C, the ends of the fret bar edge 626 have been determined as $(x_1, y_1)$ and $(x_2, y_2)$. The horizontal ($\phi_H$) and vertical ($\phi_V$) can then be determined by the following formulae:

$$\varphi_H = \tan^{-1}\frac{(|y_1 - y_2|)}{(|x_1 - x_2|)}$$

$$\varphi_V = \tan^{-1}\frac{(|x_1 - x_2|)}{(|y_1 - y_2|)}$$

Thus, for each of the detected edges, the horizontal ($\phi_H$) and/or vertical ($\phi_V$) angles for each edge can be calculated and compared with the corresponding angles of the reference edge of the marker 618. Edges which have the same the horizontal ($\phi_H$) and/or vertical ($\phi_V$) angles as the reference edge (to within a reasonable degree of error, such as 0.5°) are determined as parallel to the reference edge and thus determined as corresponding to fret bars. On the other hand, edges which have horizontal ($\phi_H$) and/or vertical ($\phi_V$) angles which differ by 90° to those of the reference edge (again, to within a reasonable degree of accuracy, such as 0.5°) are determined as perpendicular to the reference edge and thus determined as corresponding to strings. All other detected edges in the scene (that is, those which are determined as being neither parallel nor perpendicular to the reference edge, and which thus correspond to neither a fret bar nor a string) are discarded.

The detected fret bars 626 and strings 624 and then numbered by the correlation function engine 500. The fret bars 626 are consecutively numbered in ascending order, starting from the fret bar closest to the marker 618. So, the fret bar closest to the marker is labelled 1, the next fret bar is labelled 2, the next 3, etc. The fret bar numbering will continue until the last fret bar that can be seen and detected in the image has been numbered. Similarly, the strings are consecutively numbered in ascending order, starting from the string closest to the top of the image (which corresponds to the lowest bass string of the guitar). So, the bass string is labelled 1, the next string is labelled 2, etc. The string numbering will continue until all six strings of the guitar have been numbered.

The number associated with each fret bar is overlaid on top of the live image 615 in bubbles 628. Similarly, the number associated with each string is overlaid on top of the live image 615 in bubbles 630. This allows the user to inspect the automatic fret bar and string numbering that has occurred during the calibration procedure.

As a final check, the user may manually correct any fret bar or string edges which have been incorrectly detected and numbered by the calibration procedure. Such an incorrect detection and numbering may occur if, for example, the image 615 captured by the camera 406 comprises a large number of edges which do not correspond to either a fret bar or string but which have been nonetheless been detected as such by the calibration procedure. The user may perform the correction by manipulating the number bubbles 628, 630 using the touch screen functionality of the tablet 100.

For example, if an extra edge has been accidently determined as a fret bar (this could occur if there was an extra edge in the background of the image 615 which did not correspond to a fret bar, but which happened to be parallel to the reference edge of the marker), then the user may select the number bubble 628 associated with that edge and drag it with their finger to the discard region 619 of the calibration screen 617. This would signal to the correlation function engine 500 that the edge associated with the dragged number bubble 628 is not actually a fret bar, and that the edge should thus be discarded. In this case, the wrongly detected edge is discarded and, if necessary, the numbering of the remaining fret bars is amended (this is necessary if the wrongly detected edge appears between two genuine fret bar edges, in which case the deletion of the wrongly detected edge will result in a missing consecutive number if the numbering is not amended).

Once the automatic calibration process and any manual corrections have been completed, the user presses the continue button 625 to continue to the guitar lesson.

Once the strings 624 and fret bars 626 have been detected, the user may then start playing the guitar and the correlation function engine 500 may record the positions of the user's fingers with respect to the strings and fret bars. This is illustrated in FIG. 6D.

FIG. 6D shows a live image 615 of the user playing the guitar whilst wearing the finger tip sensors 102A-D, with one finger tip sensor on each finger. For simplicity, the numbering of the strings and fret bars is not shown. However, the correlation function engine 500 will be aware of the string and fret bar numbering, and will use this numbering to determine the position of each of the finger sensors. The finger sensors 102A-D are each a different colour so that each finger sensor can be individually followed by the correlation function engine 500 in the live image 615 using any suitable colour/hue detection algorithm. In embodiments, the colours may be chosen to be particularly bright or unusual (such as bright primary colours) so that the finger tip sensors can be easily detected in the image using a combination of edge detection (such as Canny edge detection, Marr-Hildreth edge detection or a Hough transform) and colour/hue detection. Various colour/hue detection algorithms are well known in the art and thus will not be considered in detail here.

Through the detection and numbering of the strings 625 and fret bars 626 and the detection of the coloured finger tip sensors 102A-D, the correlation function engine 500 is able to determine the position of each of the finger tip sensors with respect to a string and fret bar.

For the fret bar position, the detected fret bar immediately to the left of the finger tip sensor in the image 615 (and thus to the right of the finger tip sensor in real life) is determined as the relevant fret bar. This ensures that the determined fret bar number corresponds to the "fret number" (the frets actually being the regions between adjacent fret bars) that is recorded in table 600.

For the string position, then the uppermost string (that is, the string closet to the top of the image 615) with which the finger tip sensor appears to intersect is determined as the relevant string. If multiple strings have been pressed, then, as will be explained later, this is determined with respect to the frequency spectrum generated from the force data detected by the sensor.

The strings and fret bars thus effectively define a grid upon which the positions of the finger sensors 102A-D can be defined. Using the method described above (and with reference to the fret bar and string numbering in FIG. 6B), finger tip sensor 102A is thus determined to be positioned at fret 5 and string 3. Similarly, finger tip sensor 102B is determined to be positioned at fret 5 and string 3, finger tip sensor 102C is determined to be positioned at fret 4 and string 4, and finger tip sensor 102D is determined to be positioned at fret 4 and string 1.

It is noted that, on certain occasions, particular fret bars 626 may become temporarily hidden between consecutively captured images as the user moves their hand and fingers around the fret board. This problem can be alleviated by the correlation function engine 500 interpolating the position of a fret bar 626 which cannot be seen in a particular image 615 using data from previous and/or subsequent images. The correlation function engine 500 will know when to include an interpolated fret bar by measuring the distance between adjacent fret bars during the calibration procedure illustrated in FIG. 6B and then measuring the distance between adjacent visible fret bars for each captured image 615. When the distance between adjacent visible fret bars in a captured image is found to exceed the distance between those fret bars found during the calibration procedure (allowing for an appropriate margin of error, such as 10% or 20%, so as to account for the fact that the user may move the guitar closer to the camera 406 and that the observed distance between adjacent fret bars may thus legitimately appear to increase), then an error is recorded and an interpolated fret bar is added between the two visible adjacent fret bars.

In embodiments in which the distance between visible adjacent fret bars is measured for each captured image 615 and during the calibration procedure, the measured distances will be the distances from the marker 618 to fret bar 1, from fret bar 2 to fret bar 3, from fret bar 3 to fret bar 4, etc. This means that, for the captured images 615 (after calibration), if an error is found, for example, between visible fret marks 2 and 3, then an interpolated fret bar is added between fret marks 2 and 3 and the numbering of the fret bars is changed to reflect this. So, fret bar 2 remains as fret bar 2, fret bar 3 becomes fret bar 4, and the new, interpolated fret bar becomes fret bar 3. Also, all fret bars with numbering subsequent to original fret bar 3 have their numbering increased by one. This ensures that the numbering of the fret bars is corrected so as to take into account the fact that an interpolated fret bar has been added.

Figure 6E:
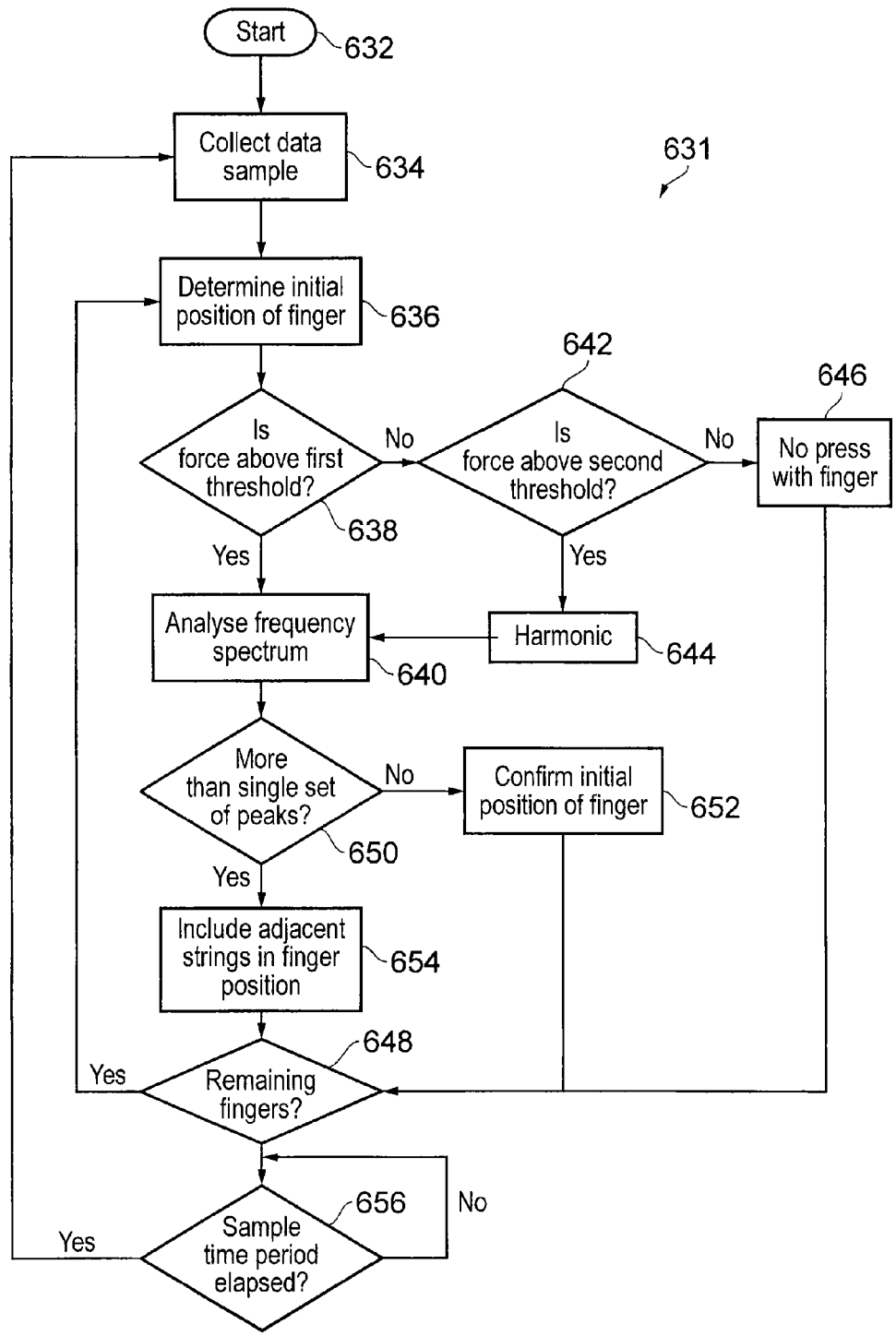
FIG. 6E shows a process in which the true finger positions of the user are mapped for a sample of collected image data ID, force data FD and/or audio data AD according to embodiments of the present disclosure.

FIG. 6E shows a process 631 in which the true finger positions of the user are mapped for each sample of collected image data ID, force data FD and/or audio data AD according to embodiments of the present disclosure.

The process starts at step 632. At step 634, the sample of image data, force data and audio data is captured by the tablet 100. As already mentioned, the image data ID is captured using the camera 406 of the tablet 100, the force data is generated by the finger tip sensors 102A-D and transmitted to the tablet 100 and the audio data AD is captured using the microphone 404 of the tablet 100.

At step 636, the image data in the form of the captured image 615 is analysed according to the methods previously described so as to determined, for a first finger tip sensor worn by the user, the position of the finger tip sensor with respect to a fret number and a string number. At this stage, no analysis has been carried out as to whether or not the user is pressing down more than one string with a single finger, and thus the determined finger tip sensor position is only an initial position which may be amended later in the process 631.

At step 638, it is then determined, from the force data generated by the finger tip sensor, whether the average force applied by the user's finger over the sample collection period is above a first threshold. This first threshold is a predetermined threshold above which it is assumed that the user is pressing fully down on the string(s) and so as to shorten the string and change its pitch.

It is noted that the sample collection period mentioned here refers to the period of time over which the sample is collected. For example, the sample collection period may be the time period which corresponds to the sample rate (so, for example, a sample rate of 100 samples per second has a corresponding time period of 0.01 seconds, which would also be the sample collection period). Alternatively, the sample collection period may be smaller, so as to reduce the amount of processing required for each sample (so, for example, a sample rate of 100 samples per second could have a corresponding sample collection period of 0.005 seconds, resulting in a reduced quantity of data to analyse before the next sample is taken).

If it is determined that the average force is above the first threshold, then the process moves on to step 640. Here, the rapidly-varying force data generated by the finger tip sensor (due to the vibration of the pushed down string(s)) over the sample period is analysed so as to produce a frequency spectrum. The frequency spectrum is produced by performing a Fourier transform on the rapidly-varying force data.

On the other hand, if it is determined that the average force is below the first threshold, then the process moves on to step 642, where it is determined whether the average force is above a second threshold, the second threshold being lower than the first. The second threshold is a predetermined threshold above which it is assumed that the user is only lightly touching the string so as to produce a soft, harmonic sound with the guitar.

If it is determined that the average force is above the second threshold, then the process moves to step 644, where the finger tip sensor position is recorded as being related to a harmonic. The process then moves onto step 640, where a Fourier transform is applied to the rapidly-varying force data generated by the finger tip sensor.

On the other hand, if it is determined that the average force is below the second threshold, then it is assumed that no strings are being touched by the finger tip sensor (the string is being played openly), and thus that the initial position of the finger tip sensor as determined from the image data in step 636 actually related only to the user's finger being above the strings without touching them. The process thus moves on to step 646 in which the initial position of the finger is updated to record the fact that no string has been pressed. In this case, the finger position can be recorded as (000000, 0) in table 600. The process then moves on to step 648, in which it is determined as to whether or not there are any remaining figure tip sensors 102A-D which have not yet been analysed.

In the case that the average force generated by the finger tip sensor is determined to be above the first or second threshold, the process moves from step 640 to step 650, in which it is determined, from the Fourier transform of the rapidly-varying force data, whether or not there is more than one set of harmonic peaks. As already mentioned, in the case that only a single string has been pressed, there will be only a single set of peaks, with each of the peaks separated by a constant frequency difference. On the other hand, if more than one string has been pressed, then harmonics from each of the pressed strings will be detected, resulting in more than one set of peaks (one set for each string pressed). In this case, the frequency difference between the peaks will vary between several values, with the total number of different frequency difference values being indicative of the number of pressed strings.

In the case that there is not more than one set of peaks, the process moves on to step 652. Here, the initial position of the finger tip sensor, in which the finger tip sensor is positioned at only one string, the one string being the uppermost string (that is, the string closet to the top of the image 615) with which the finger tip sensor appears to intersect, is confirmed.

On the other hand, in the case that there is more than one set of peaks, the process moves on to step 654. Here, the initial finger sensor tip position is amended so as to include a number of additional, adjacent strings. The number of additional strings is determined according to the number of additional sets of peaks (and thus the number of additional frequency difference values) detected in the Fourier transform. So, for example, if two sets of peaks were detected, then this means that there is one additional set of peaks (compared to the pressing down of a single string), and thus one additional, adjacent string is added to the initial finger position. Alternatively, if three sets of peaks were detected, then this means that there are two additional sets of peaks (compared to the pressing down of a single string), and thus two additional, adjacent strings are added to the initial finger position.

The adjacent strings added are the next consecutively numbered strings with respect to the string recorded in the initial finger tip sensor position. So, for example, if the initial finger tip sensor position records string 2 (see FIG. 6B) as being pressed down (corresponding to an initial finger tip sensor string position of 010000), then one additional string will result in the addition of string 3 (corresponding to a new finger tip sensor string position of 011000). Alternatively, two additional strings will result in the addition of strings 3 and 4 (corresponding to a new finger tip sensor string position of 011100).

The above method works on the assumption that a user can only press down adjacent strings with a single finger (rather than non-adjacent strings). Advantageously, by using this method, in which image data is complemented with force data from the finger tip sensors, the finger positioning of a user can be accurately determined without having to perform advanced image processing techniques for determining which strings have been pressed and which have not. Rather, the image data only needs to be analysed to determine the uppermost string pressed down by the user and the remaining information regarding additional strings, harmonics, etc. is obtained from the force data. The reduction of a need for advanced image processing techniques reduces the amount of processing required in obtaining the finger position of the user.

After the initial finger tip sensor position has been updated, the process moves on to step 648. Here, it is determined whether or not there are remaining finger tip sensors 102A-D which have not yet been analysed for the sample. If there are remaining finger tip sensors, then the process moves to step 636, at which point the finger position determination process is repeated. On the other hand, if all finger tip sensors have been analysed for the sample, then the process moves onto step 656.

At step 656. it is determined whether or not the sample time period has elapsed. The sample time period is the corresponding time period to the sample rate (so, for example, a sample rate of 100 samples per second would have a sample time period of 0.01 seconds). If the sample time period has not yet elapsed, then step 656 is repeated. On the other hand, if the sample time period has elapsed, then the process returns to step 634, at which point the next sample of image data ID, force data FD and audio data AD is taken.

It is noted that, throughout the process 631 of FIG. 6E, the Fourier transform and frequency analysis of the strings is conducted solely through the force data provided by the finger tip sensors 102A-D. However, in embodiments, it is also envisaged that the audio data AD picked up by the microphone could also be used to analyse the frequencies of the strings and to determine which strings have been plucked. This analysis could be based on, for example, particular characteristics of the strings which are known to the correlation function engine 500 in advance. Alternatively, the audio data AD could simply be recorded, and associated with the each of the samples in the correlation function, so that a user can record a performance with their musical instrument and, based on a certain part of their performance as determined by the audio recording, look at the correlation function associated with that certain part and obtain feedback (the way in which feedback may be presented to the user is described later on).

Once the user correlation function has been obtained for a user's performance, then this correlation function can be compared to a professional correlation function that has been obtained for a performance by a professional musician. It should be noted that the correlation function for the professional musician will be captured in the same manner as for the user explained above. There are many ways in which the user and professional correlation functions could be compared.

A first comparison method, according to embodiments, is shown in FIG. 7. Here, for each captured sample of the user and professional correlation functions (captured samples with the same captured time corresponding to the same point in a musical performance for the user and professional), the user finger tip sensor position 702 is compared with the professional finger tip sensor position 704. An error value 706 can then be determined from this comparison.

For a first sample (at 0.01 seconds), both the string and fret positions of the user match that of the professional. There is therefore no error, and the error value 706 is recorded as 0.

For a second sample (at 0.10 seconds), the string position of the user matches that of the professional. However, the fret position of the user does not match, meaning that the user has made an error with the fret position. Due to the fact that a single error has occurred (fret position only), the error value 706 is recorded as 1.

For a third sample (at 0.25 seconds), neither the string position nor the fret position of the user matches that of the professional, meaning that the user has made an error both with the string and fret positions. Due to a fact that a double error has occurred (string and fret position), the error value 706 is recorded as 2.

The sample comparisons and error values shown for a single finger tip sensor in FIG. 7 will be generated for each of the user's finger tip sensors. As will be seen, this will then allow feedback to be given to the user as to which parts of the performance they need to improve so that their performance more closely matches that of the professional.

It will be appreciated that any form of error value system could be established following the comparison of the user and professional finger positions. Here, a simple two-tier error system has been introduced (an error value of 1 for a single fret or string error and an error value of 2 for both a fret and string error). However, there are many other systems which could be implemented. For example, the error could increase depending on how many strings are incorrect (so that a single bit discrepancy in the comparative string positions of the user and professional would result in an error value of 1, two bit discrepancies would result in an error value of 2, etc.) or how large the fret error is (so that a fret position of 6 instead of 5 would result in an error of 1, a fret position of 7 instead of 5 would result in an error of 2, etc.).

The error value system could also take into account additional factors to the positions recorded in the table of FIG. 7, such as whether or not, for a certain string and fret position, the force exerted on the string by the user is above the first force threshold (indicating that the string has been fully pressed down) or is between the first and second force thresholds (indicating that the string is merely being lightly touched so as to produce a soft, harmonic sound with the guitar). This could be indicated by an additional harmonic bit, for example, with 0 indicating a normal pressing of the string and 1 indicating a lighter press of the string. The user's harmonic bit could then be compared with the professional's harmonic bit, and an error value 706 of 1 could be generated in the case that the user and professional harmonics bits do not match for a certain sample.

Figure 8:
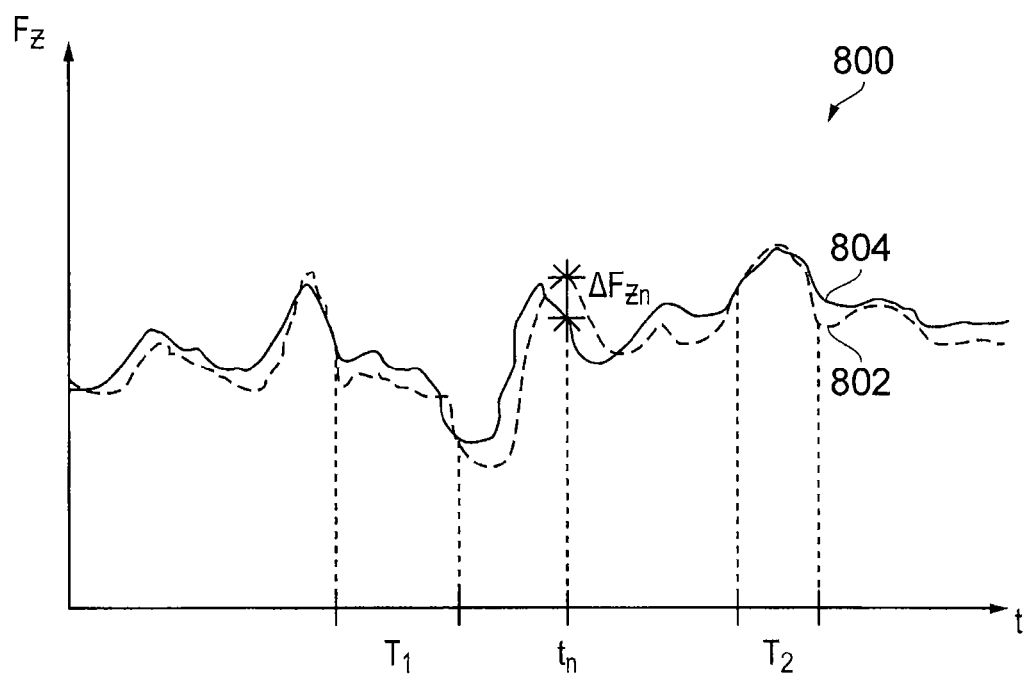
FIG. 8 shows a second correlation function comparison method according to embodiments of the present disclosure.

A second comparison method, according to embodiments, is shown in FIG. 8. Here, a graph 800 of the average force in the z direction (that is, towards the fret board of the guitar) over the sample collection period for each captured sample is shown against time for a single finger tip sensor. The dashed line 802 shows the average force for the user and the solid line 804 shows the average force for the professional. The discrepancy between the average force of the user and the average force of the professional at a given time $t_n$ is given by $\Delta F_{zn}$.

The pressure exerted by a player on the strings of a guitar can affect the sound of the guitar. Thus, in order for the user's performance to match the professional's performance as closely as possible, the user may wish to exert a force on the strings with each finger which is similar to that used by the professional. Thus, by use of the graph 800, the user may identify time periods during their performance in which the force they exert closely matches that of the professional (for example, time period $T_2$). They may also identify time periods during their performance in which the force they exert is significantly different to that of the professional (for example, time period $T_1$), and where they thus may need to improve.

As well as identifying particular regions of the performance which may require improvement with regards to the force applied to the strings, an overall score of the force difference between the user and the professional may be calculated using the force difference $\Delta F_{zn}$ for each of the captured samples at time $t_n$. This overall score may be given as:

$$\text{Total Error} = \sqrt{\sum_n (\Delta F_{Zn})^2} \quad (1)$$

The user may thus work to reduce the total error in their performance with regards to the force exerted on the strings. A graph 800 like that shown in FIG. 8 may be generated for each of the user's finger tip sensors and the total errors for each of the finger tip sensors may be added to give an overall error which the user can try and reduce as their musical performance is improved.

FIGS. 9A-9D show a process by which, according to embodiments, a user selects a song to perform and performs the song so that the performance can be converted to a correlation function CF using the correlation function engine 500. The user interface described here may be interacted with by the user via a touch sensitive screen of the tablet 100.

Figure 9A:
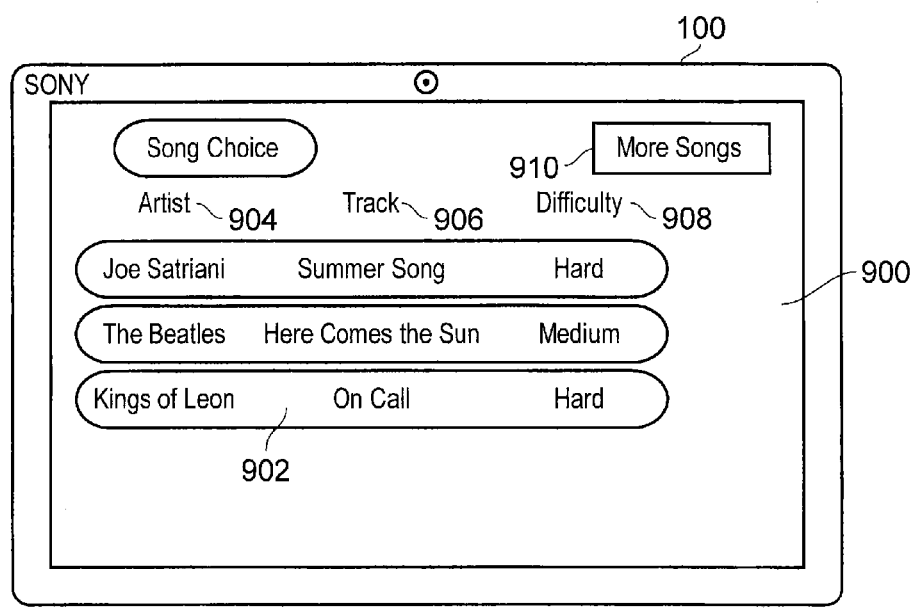
FIG. 9A shows a tablet computer showing a song selection screen according to embodiments of the present disclosure.

In FIG. 9A, after an appropriate piece of application software ("an app") is downloaded to the tablet and opened on the tablet, a song selection screen 900 is shown on the tablet. The tablet may be provided with the app pre-installed at purchase or may be downloaded from an appropriate app store either free of charge or for a nominal sum of money. The finger sensors described above may be provided free of charge with the tablet, or may be provided to the user after download of the app. The song selection screen shows a selection of songs 902 which the user can select. These will be songs which have been purchased electronically by the user and downloaded from an external server (not shown) or may be provided free of charge on the tablet or with a purchased album. Included in the downloaded song will be a professional correlation function which has been previously recorded by a professional musician, together with audio and/or video data of the professional musician's performance. As described above, by including a professional correlation function with the song, a correlation function generated by the user can be compared with this professional correlation function so that the user can obtain feedback on how their performance may be improved.

Each of the songs 902 are identified by an artist 904, a track name 906 and a difficulty rating 908. The difficulty rating gives an indication of how difficult the song may be to perform, so that a user can choose a song which is appropriate to the musical skills and experience. The difficulty rating will be decided in advance and provided as metadata with the professional correlation function and audio and/or video data which defines the song. On the song selection screen 900, the user also has the option of pressing the virtual button 910, which will direct the user to an online store in which more songs can be purchased.

Figure 9B:
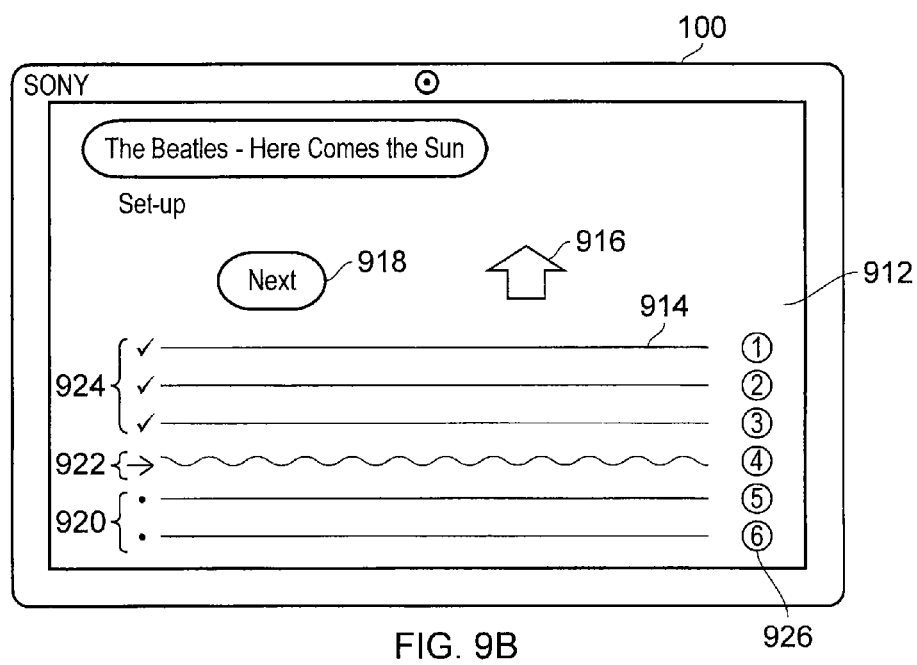
FIG. 9B shows a tablet computer showing a set-up screen according to embodiments of the present disclosure.

The user is able to select a song to perform simply by touching the appropriate song 902 on the song selection screen 900. Once a song has been selected, the screen changes to the set-up screen 912, as illustrated in FIG. 9B. It can be seen that here, the user has chosen the song "Here Comes the Sun" by The Beatles.

The set-up screen 912 allows the user to tune their guitar so that it matches the tuning of the guitar used by the professional musician when the professional performance was recorded and the professional correlation function was generated. This ensures that the comparison of any audio data AD for the user and professional performances is meaningful, in that corresponding strings of the user and professional guitars generate the same frequencies. Also, if a backing track is provided for the user by the tablet 100 as the user records their musical performance, then it is necessary that the user's guitar is tuned so that it is in the same key as the backing track.

During the guitar set-up, the user works their way through each string of the guitar, starting from the string 1 with the lowest natural pitch (the lowest bass string of the guitar) and ending with string 6 with the highest natural pitch (the highest pitch string of the guitar). The numbering of the strings is indicated graphically by number bubbles 926, and matches the string numbering used in the previously described correlation function generating process.

In order to tune each string, the user plucks the string openly (that is, without pressing the string down at any point on the fret board), the microphone 404 of the tablet picks up the sound and the frequencies of the string are analysed and compared with those of the corresponding professional string frequencies. The tuning adjustment icon 916 then indicates whether or not a tuning adjustment is required and what this tuning adjustment should be. Methods of comparing the frequencies of a plucked string for the purpose of guitar tuning are well known in the art and are thus not described in detail here.

In the example in FIG. 9B, the tuning adjustment icon 916 is an upwards pointing arrow, indicating that the pitch of the string needs to be increased and thus that the string should be tightened. The user may thus tighten the string using the tuning keys of the guitar (not shown). In the case that the pitch of the string needs to be reduced, the tuning adjustment icon 916 may instead by a downwards pointing arrow. This indicates to the user that the tightness of the string needs to be reduced, again by turning the tuning keys of the guitar (although in the opposite direction). In the case that the pitch of the string is correct, then the tuning adjustment icon 916 can indicate this in any suitable way. For example, the tuning adjustment icon 916 could read "OK" or similar.

As the user adjusts the tension of the string in accordance with the upwards and/or downwards arrows of the tuning adjustment icon 916, the pitch of the string will eventually match the pitch of the corresponding professionally tuned guitar string. At this point, the tuning adjustment icon 916 will indicate that the pitch of the string is correct (by reading "OK" or similar) and the user may then press the virtual button 918 to progress to the next string.

The progress of the string tuning process is indicated by graphical strings 914 and the associated tuning indicators 920, 922 and 924. For strings which have been correctly tuned (strings 1, 2 and 3), the tuning indicator is a tick 924. For the string which is currently being tuned (string 4), the tuning indicator is an arrow 922. Graphics may also be applied to the string which is currently being tuned. For example, the graphical string may be made to vibrate when the microphone of the tablet 100 detects that the string has been plucked. For strings which are still yet to be tuned (strings 5 and 6), the tuning indicator is a dot 920. Of course, the string indicators may comprise any appropriate graphics which indicate to the user the tuning status of each string.

Figure 9C:
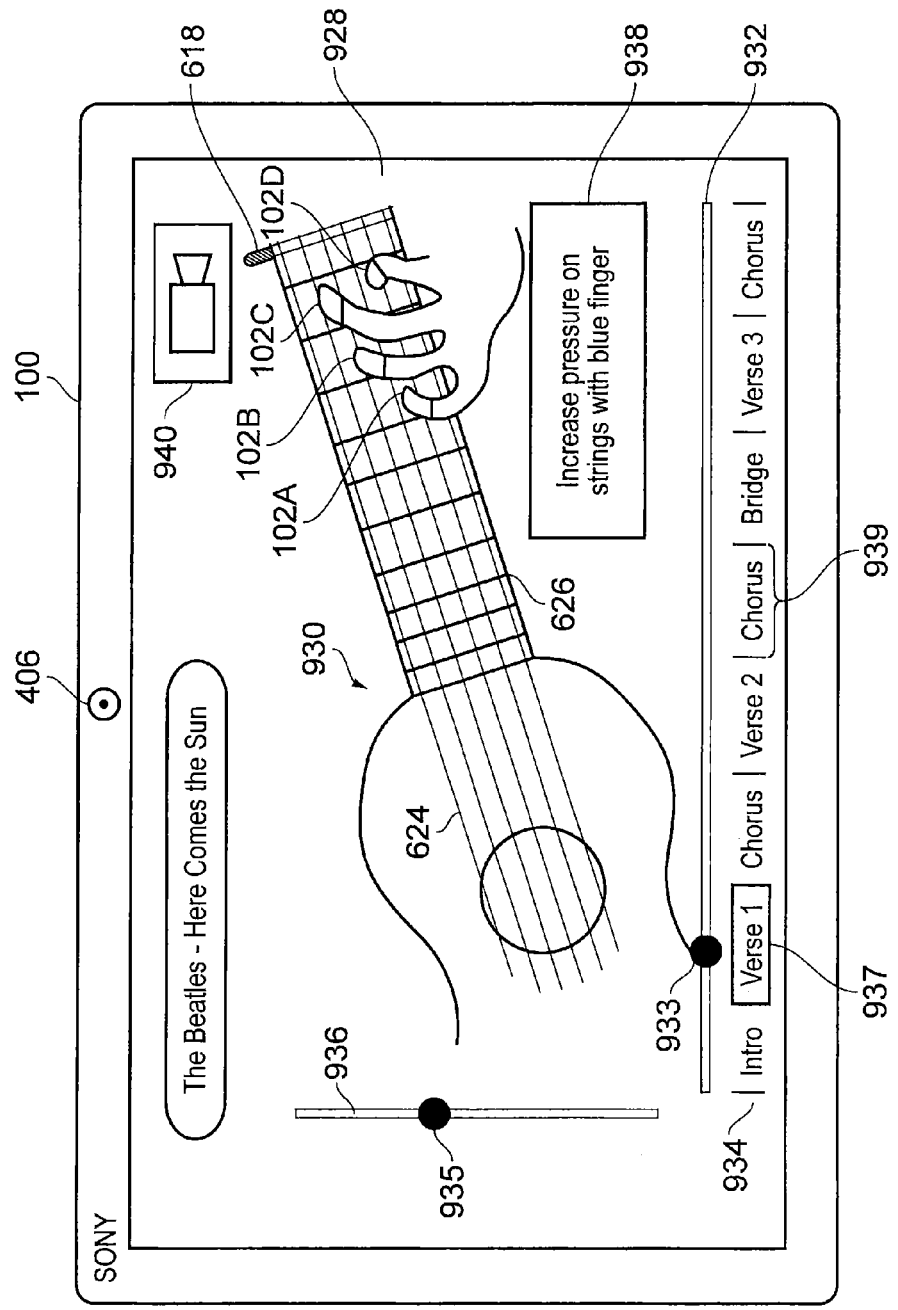
FIG. 9C shows a tablet computer showing a performance screen according to embodiments of the present disclosure.
Figure 9D:
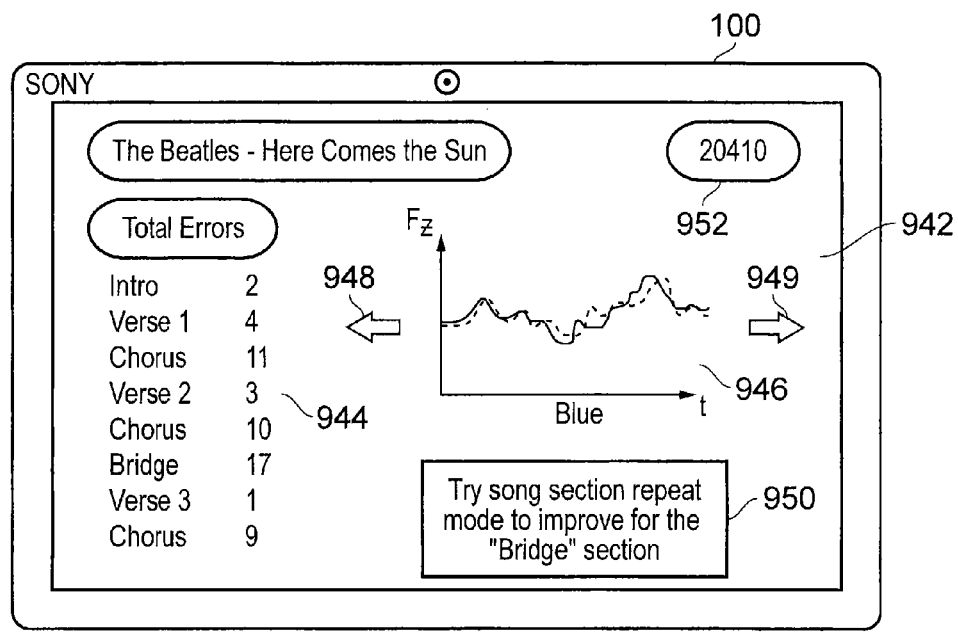
FIG. 9D shows a tablet computer showing a results screen according to embodiments of the present disclosure.

Once all strings have been correctly tuned (that is, after string 6 has been correctly tuned), the user will press the virtual button 918 once more to start the recording of their musical performance. During the performance, a performance screen 928 is displayed to the user. This is illustrated in FIG. 9C.

The performance screen 928 shows a real time live video image 930 of the user playing their guitar which has been captured by the camera 406. In the captured image, the strings 624, fret bars 626, marker 618 and finger tip sensors 102A-D can be seen. As described earlier, processing is performed on the live image 930 and on force data FD generated by the finger tip sensors 102A-D and/or audio data AD detected by the microphone 404 so as to detect the positions of the user's fingers with respect to the strings 624 and frets 626 of the guitar. This processing is performed at a predetermined sample rate and the finger positions of the user at each sample are recorded so that they may be compared with the corresponding finger positions of a professional musician.

In embodiments, an audio recording of the professional performance of the song is provided to the user as a backing track by way of speakers (not shown) included in the tablet 100. The provision of the professional performance as a backing track is highly advantageous, as it allows the user to aurally match their performance with that of the professional (perhaps with an additional rhythm, vocals, bass line, etc.) and to quickly determine which part of the song they are at during a performance. The professional performance used for the audio backing track will be the same performance for which a professional correlation function CF has been recorded.

The time elapsed during the performance is indicated by the progress bar 932 and progress indicator 933. An actual time (in minutes and seconds, for example), could also be included on the performance screen 928 (although this is not shown). The user may touch and drag the progress indicator so as to move between different parts of the songs. This allows the user to practise a particular part of the song which they feel they need to improve, for example. As the user moves the progress indicator 933, the backing track is skipped to the part of the song indicated by the progress indicator 933, thus allowing the user to repeat a desired section of the performance with the backing track.

As well as the progress bar 932 and progress indicator 933, there is also provided a song section indicator 934 which indicates predetermined sections 939 of the song which a user is likely to want to repeat. For example, the song may be divided into various verses, a chorus and a bridge, and the user may want to be able to quickly skip to one of these sections 939 without having to manually find the section using the progress indicator.

The song section which is currently being played may be indicated graphically using any suitable method, such as highlighting 937. The user may select a particular song section 939 simply by touching it. At this point, the backing track will skip to the beginning of the chosen section and the user's correlation function data (that is, the image data ID, force data FD and/or audio data AD which define the user's correlation function) will be recorded from a time in the song corresponding to the beginning of that chosen section.

It is noted that as the user skips between different parts of the song, either by way of the progress bar 932 and progress indicator 933 or by way of the song section indicator 934, the backing track and the time at which the user's correlation function starts being sampled and recorded is adjusted according to the elapsed song time at the chosen part of the song.

So, for example, if the user skips to time 1:36:23 in the song by touching and dragging the progress indicator 933, then the backing track will be skipped to time 1:36:23 and the correlation function data of the user will be sampled and recorded from time 1:36:23 (so, for example, a new record will be added to table 600 in FIG. 6A at the predetermined sample rate from time 1:36:23). Similarly, if the user skips to the first chorus, which happens to be at time 0:48:20, then the backing track will be skipped to time 0:48:20 and the correlation function data of the user will be sampled and recorded from time 0:48:20.

It is noted that if correlation function data has already been recorded by the correlation function engine 500 for a particular time which the user has skipped to (this could occur if, for example, the user decides to go back to a particular part of the song which they have already performed but which they wish to improve), then the previous correlation function data is overwritten. Advantageously, this allows a user to go back and improve a particular part of the song that they have already played, thus improving the extent to which that part of their performance matches that of the professional. The user can do this without having to repeat the entire performance again.

The performance screen 928 also includes a speed bar 936 and speed indicator 935 which allows the user to adjust the speed of the backing track and thus the speed at which they are expected to play so as to match their performance with that of the professional. If the user touches and drags the speed indicator 635 in an upwards direction, then the speed of the backing track is increased and the correlation function data samples are obtained from the user's performance at a faster rate. On the other hand, if the user touches and drags the speed indicator 935 in a downwards direction, then the speed of the backing track is reduced and the correlation function data samples are obtained from the user's performance at a reduced rate. Advantageously, this allows the user to adjust the speed at which they are expected to play during the performance. Inexperienced users can thus choose to play more slowly, whereas more experienced users can play at an increased speed. In embodiments, the maximum speed may be the speed at which the professional musician made the original recording.

It is noted that as the speed at which the backing track is played and at which the user function correlation data is sampled is adjusted, the time elapsed during the performance remains unchanged as a marker of the extent to which the performance has been completed. Thus, for example, if the performance is recorded as being 3:12:59 minutes long, then this does not change in the case that the performance is slowed down, even though, in reality, it may take more than a time of 3:12:59 for the user to complete the performance with the backing track. Similarly, the sample rate is judged with respect to the unchanged marker. So, for example, if, at the full speed performance, a sample is captured every 0.01 seconds, then samples will continue to be captured every time the elapsed time changes by 0:0:01, even though, in reality, the sample rate will be reduced for a slowed down track. Thus, for a track which is played at half speed, a sample will be captured every time the elapsed time changes by 0:0:01, but, in reality, this will actually equate to a sample being captured every 0.02 seconds.

Advantageously, this removes the need to adjust the elapsed time and predetermined sample rate as the speed of the performance is changed, thus reducing the amount of processing required by the correlation function engine 500.

During the recording of a performance, the user may press the virtual button 940 to toggle between the live video image of their own performance 930 and a pre-recorded video image of the professional musician (now shown) at a corresponding point in the performance (as determined by the elapsed time in the performance). The video image of the professional musician will be the corresponding video data to the audio data of the backing track. Advantageously, this allows the user to visually compare their performance with that of the professional in real time. The video image of the professional musician can be skipped using the progress bar 932 or song section indicator 934 and slowed down/sped up using the speed bar 936 in exactly the same way as previously described.

There may also be a further toggle screen accessible by pressing the virtual button 940 in which the live video image of the user's performance 930 and pre-recorded video image of the professional's performance are placed side-by-side in a split-screen arrangement (now shown). Advantageously, in this case, the user is able to directly visually compare their own performance (such as their finger positioning) with that of the professional musician whilst looking in a single place (that is, at the screen of the tablet 100). In this case, through successive presses of the virtual button 940, the video shown on the performance screen 928 will toggle between the live video image of the user performance, the pre-recorded video image of the professional performance and the split-screen arrangement.

The performance screen 928 can also include an advice box 938 which offers real time advice to the user on how to improve their performance. This is based on a real time comparison of the user correlation function and the professional correlation function. The generation of real time advice is explained later on.

After the performance has finished, a results screen 942 is displayed to the user. This presents a range of different types of feedback information based on a comparison between the newly generated user correlation function and the professional correlation function. Any suitable feedback information which can be generated from the user correlation function and professional correlation function can be displayed here.

A first example of feedback information is the total error information 644. This indicates the total finger positioning error for each section of the song. The total finger positioning error for each song section is determined from the total of the error values 706 (see FIG. 7) for each finger tip sensor 102A-D over the time period corresponding to that section. So, for example, if verse 1 occurs from elapsed time 0:20:00 until elapsed time 0:41:59, then the error values 706 for each finger tip sensor during this time period are totaled. The total errors for each finger tip sensor are then added together to give an overall value, which is then displayed (giving a total of 4 errors for verse 1 in this case). Advantageously, this information allows the user to see which part of their performance has the most and the least errors finger positioning errors, and thus which parts they need to improve.

An advice box 950 also gives tailored feedback to the user. This feedback is generated on the basis of the user correlation function and professional correlation function comparison carried out by the correlation function engine 500. In this case, for example, it has been noticed that the user has a particularly high finger positioning error value for the "bridge" section of the song. The advice box 950 thus suggests that the user use the "song section repeat mode" (by selecting the relevant section from the song section indicator 934) to practise the "bridge" section. Any suitable feedback which can be generated by the correlation function engine 500 from the user and professional correlation function comparison may be displayed in the advice box 950.

A second example of feedback information is the force $F_Z$ against time graph 946 first illustrated in FIG. 8. Here, the graph is presented for each finger tip sensor 102A-D individually, and the user may toggle between the graphs for each finger tip sensor by touching the virtual toggle buttons 948, 949 so as to see which of their fingers they need to improve with regards to how much force is applied to the strings. For convenience, each finger is indicated by the colour of its corresponding finger tip sensor. The total error (as given by equation (1)) could also be included for each graph (although this is not shown here). As an alternative, the force $F_z$ against time graphs (user and professional) for each finger tip sensor 102A-D could be displayed on the same axes, with the graphs corresponding to each finger tip sensor being differentiate by the finger tip sensor colour. Alternatively and additionally, a graph of other characteristics may be shown, such as a graph of the differences in the audio captured by the microphone 404 over time.

As well as the detailed feedback information 944, 946, a total score 952 is also given for the user's performance. This may be calculated using any suitable method, and can take into account any suitable range of factors. For example, contributing factors to the total score could include the total number of finger position errors, the total force error for each finger, the speed at which the song was performed (with more points being award for faster speeds), etc. Advantageously, by recording a total score in this way, the user is able to obtain an overall indicator of the quality of their performance.

Figure 10:
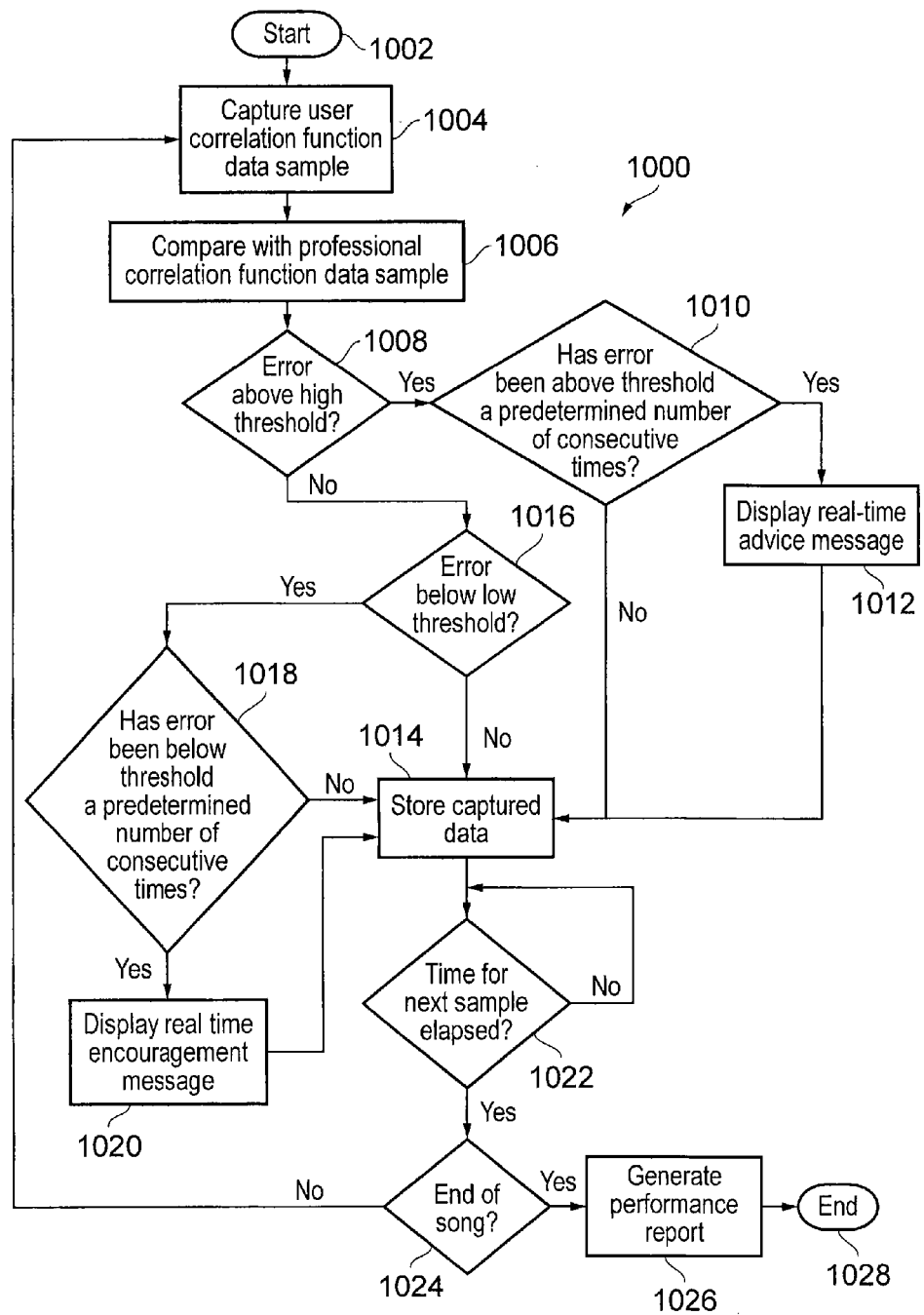
FIG. 10 shows a process by which user correlation function data is obtained and compared with professional correlation data and by which user feedback is generated, according to embodiments.

FIG. 10 shows a process 1000 by which user correlation function data is obtained and compared with professional correlation data and by which user feedback is generated, according to embodiments.

The process starts at step 1002. At step 1004, a sample of user correlation function data is obtained. The user correlation function data includes image data ID from the camera 406 of the tablet 100, force data FD generated by the finger tip sensors 102A-D and/or audio data AD detected by the microphone 404 of the tablet 100. At step 1004, the user correlation function data is processed so as to determine, for the sample, the positions of the finger tip sensors 102A-D with respect to the strings 624 and frets 626 of the guitar and the average force applied by each of the finger tip sensors 102A-D.

The process then moves on to step 1006, where the processed user correlation function data is compared with the corresponding processed professional correlation function data. So, for example, the finger positioning of the user is compared with that of the professional and the average force applied by each of the fingers of the user is compared with that of the professional.

At step 1008, following the comparison of the user and professional data, it is determined whether or not there are any errors in the user's performance which exceed a high error threshold. For the finger positioning, the high error threshold may simply be an error value of 2 (so that an error in both the string and fret position, which corresponds to an error value of 2, is determined as exceeding the high error threshold). For the force applied for each finger, then the high error threshold may be an absolute force error (for example, 2 Newtons) or, alternatively, a percentage error (such as 15%).

In the case that there is an error which exceeds the appropriate high error threshold, the process moves on to step 1010. Here, it is determined, for each error which has exceeded the high error threshold, whether this has occurred a predetermined number of consecutive times. This predetermined number is known as the error occurrence threshold.

In the case that the error occurrence threshold has been met for a particular error, the process moves onto step 1012. In this case, a real-time advice message is provided to the user. This may be provided in the real-time advice box 938 on the performance screen 928. The real-time advice message provides tailored feedback to the user on their performance, taking into account the type of error that they have been making.

For example, if a finger positioning error has consecutively occurred a number of times equal to the error occurrence threshold, then an error telling the user that they need to practise their finger positioning is displayed to the user. If the error appears to be being mainly caused by a single finger, then the colour of the finger tip sensor associated with that finger could also be included in the advice message.

Alternatively, if a force error has consecutively occurred a number of times equal to the error occurrence threshold, then an error telling the user to apply more force to the strings (in the case that the user has not been applying enough force to the strings, for example) is displayed. Again, if the error appears to be being mainly caused by a single finger, then the colour of the finger tip sensor associated with that finger could also be included in the advice message.

Any suitable error occurrence threshold may be used. For example, the error occurrence threshold may be 25, 50, 75 or 100 consecutive errors (corresponding to an elapsed track time of 0.25, 0.50, 0.75 and 1.00 seconds, respectively, for a sample rate of 100 samples per second). The different types of error (that is, the finger positioning error and the force error) may have the same error occurrence threshold or may have different error occurrence thresholds.

In the case that the error occurrence threshold has not been met for any of the detected errors, then no message is displayed to the user. Rather, the process moves onto step 1014 and the user correlation function data is stored as part of the user correlation function (for example, as part of the table 600 in FIG. 6A).

Advantageously, by counting the number of consecutive errors made by the user which exceed the high error threshold and by alerting the user when the number of consecutive errors is equal to the error occurrence threshold, the user is made aware of significant errors which appear to be being made consistently. At the same time, occasional errors (which are unlikely to cause any real problems for the user) are ignored.

In the case that there is no error which is above the high error threshold at step 1008, the process moves onto step 1016. Here, it is determined whether or not there are any errors which are below a low error threshold. The low error threshold indicates an error below which it is determined that the user is playing well.

For the finger positioning, the second threshold may simply be an error value 706 of 1 (so that a perfectly correct finger position, which corresponds to an error value of 0, is determined as being below the low error threshold threshold). For the force applied for each finger, the low error threshold may be an absolute force error (for example, 1 Newton) or, alternatively, a percentage error (such as 5%).

In the case that there is an error which is below the appropriate low error threshold, the process moves on to step 1018. Here, it is determined, for each error which is below the low error threshold, whether this has occurred a predetermined number of consecutive times. This predetermined number may be the same error occurrence threshold used in step 1010, or it may be different. In this embodiment, it is the same error occurrence threshold that is used.

In the case that the error occurrence threshold has been met for a particular error, then the process moves onto step 1020. In this case, a real-time encouragement message is provided to the user. This may be provided in the real-time advice box 928. The real-time encouragement message provides tailored feedback to the user on their performance, taking into account the type of error which has been kept below the low error threshold.

For example, if a finger positioning error has been zero (below the low error threshold of 1, indicating perfectly correct finger positioning) for a consecutive number of times equal to the error occurrence threshold, then a message telling the user that they have achieved perfect finger positioning is displayed. Alternatively, if a force error for a particular finger tip sensor has been below the low error threshold for a consecutive number of times equal to the error occurrence threshold, then a message telling the user that they have achieved a very good level of force for that particular finger sensor is displayed.

In the case that the error occurrence threshold has not been met for any of the detected low error values at step 1018, then no message is displayed to the user. Rather, the process moves onto step 1014 and the user correlation function data is stored as part of the user correlation function.

Advantageously, by counting the number of consecutive low errors made by the user and encouraging the user when the number of consecutive low errors is equal to the error occurrence threshold, the user is made aware of the aspects of their musical performance for which they are doing very well. At the same time, occasional low error values (which may occur randomly, even if the user is not playing very well overall) are ignored.

At step 1016, if it is determined that there are no errors which are below the low error threshold, then the process simply moves onto step 1014, where the user correlation function data is stored as part of the user correlation function.

From step 1014, the process moves onto step 1022, where it is determined whether or not it is time for the next sample to be obtained. So, for example, if the sample rate is 100 samples per second (corresponding to a sample being taken every 0.01 seconds) with respect to the time elapsed for the track, then it is determined whether or not 0.01 seconds of time elapsed for the track has passed since the last sample.

If the time for the next sample has not elapsed, then step 1022 is repeated until the time for the next sample has elapsed. Once the time for the next sample has elapsed, then the process then moves onto step 1024, where it is determined whether or not the end of the song has been reached. This is determined by comparing the total time elapsed for the track so far with the length of the track. If the song has not yet ended, then the process goes back to step 1004, at which point the next sample of user correlation function data is obtained. On the other hand, if the song has ended, then the process moves onto step 1026, where a performance report is generated and displayed on the results screen 942. The process then ends at step 1028.

Figure 11:
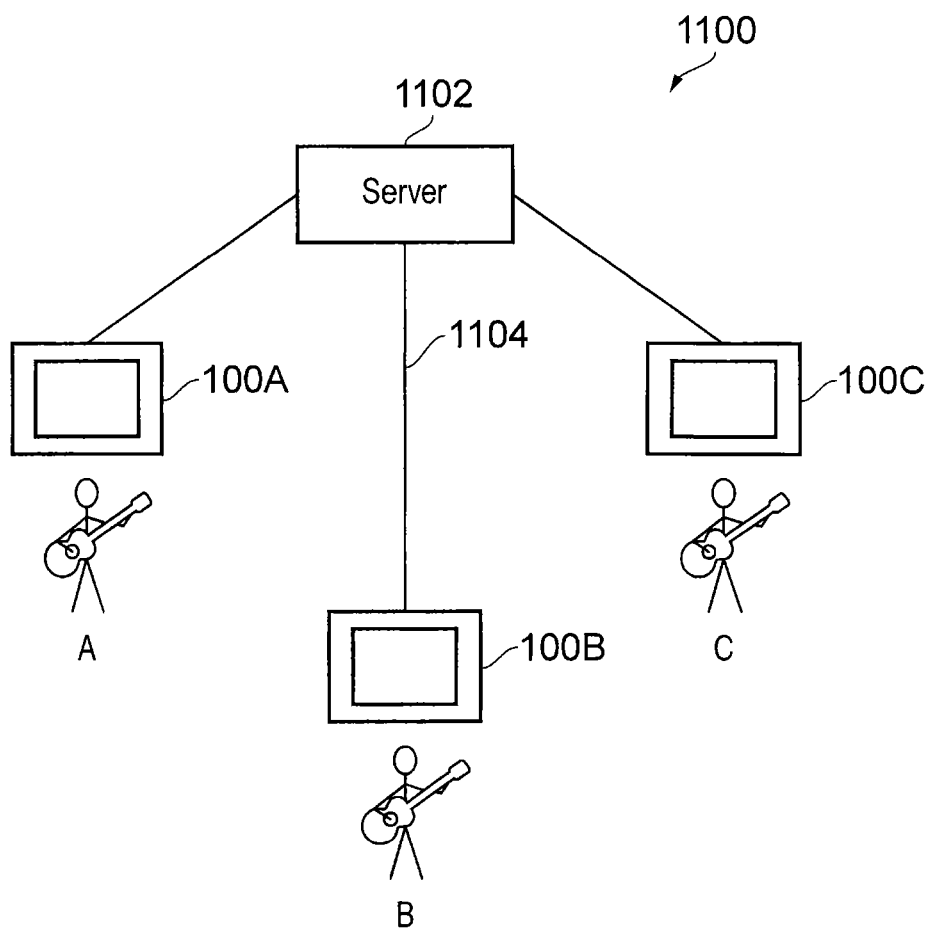
FIG. 11 shows a system over which users may compete in competitions, according to embodiments.

In embodiments, it is possible for several users, each with an individual tablet 100 installed with the correlation function engine 500, a guitar and a set of finger tip sensors to compete in online competitions so as to see which user is able to best replicate the performance of the professional musician. A system 1100 by which this may take place is illustrated in FIG. 11.

The system 1100 comprises a tablet 100A-C for each of the users A-C and a server 1102. Each of the tablets 100A-C is connected to the server by means of a network data connection 1104. This network data connection 1104 may be a connection over the internet. In embodiments, the tablets 100A-C may connect wirelessly to the internet via the wireless data transceiver 410 comprised within each tablet.

Figure 12:
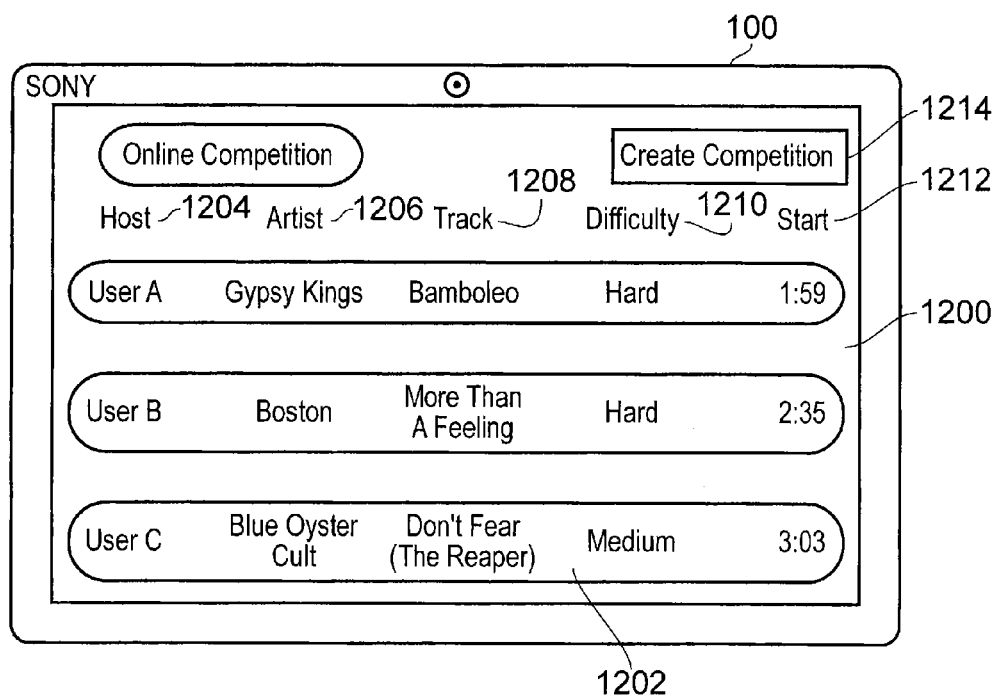
FIG. 12 shows a tablet computer showing an online competition screen according to embodiments of the present disclosure.

According to embodiments, in order to take part in an online competition, a user may access an online competition screen 1200 via their tablet 100, as shown in FIG. 12. The online competition screen 1200 lists all the online competitions 1202 which have been created and which the user may be able to join. Each online competition 1202 is listed with basic information. This includes the host name 1204 of the user who created the competition, the artist 1206, track name 1208 and difficulty 1210 of the song which has been chosen for the competition, and a start time 1212 for the competition. In embodiments, the competitions are listed in ascending order of start time (with the competition which is closest to starting being displayed first), and the start time counts down in one second intervals until the start of the competition.

The user also has the option creating a new competition by pressing the virtual button 1214. This is explained in more detail with respect to FIG. 13.

Figure 13:
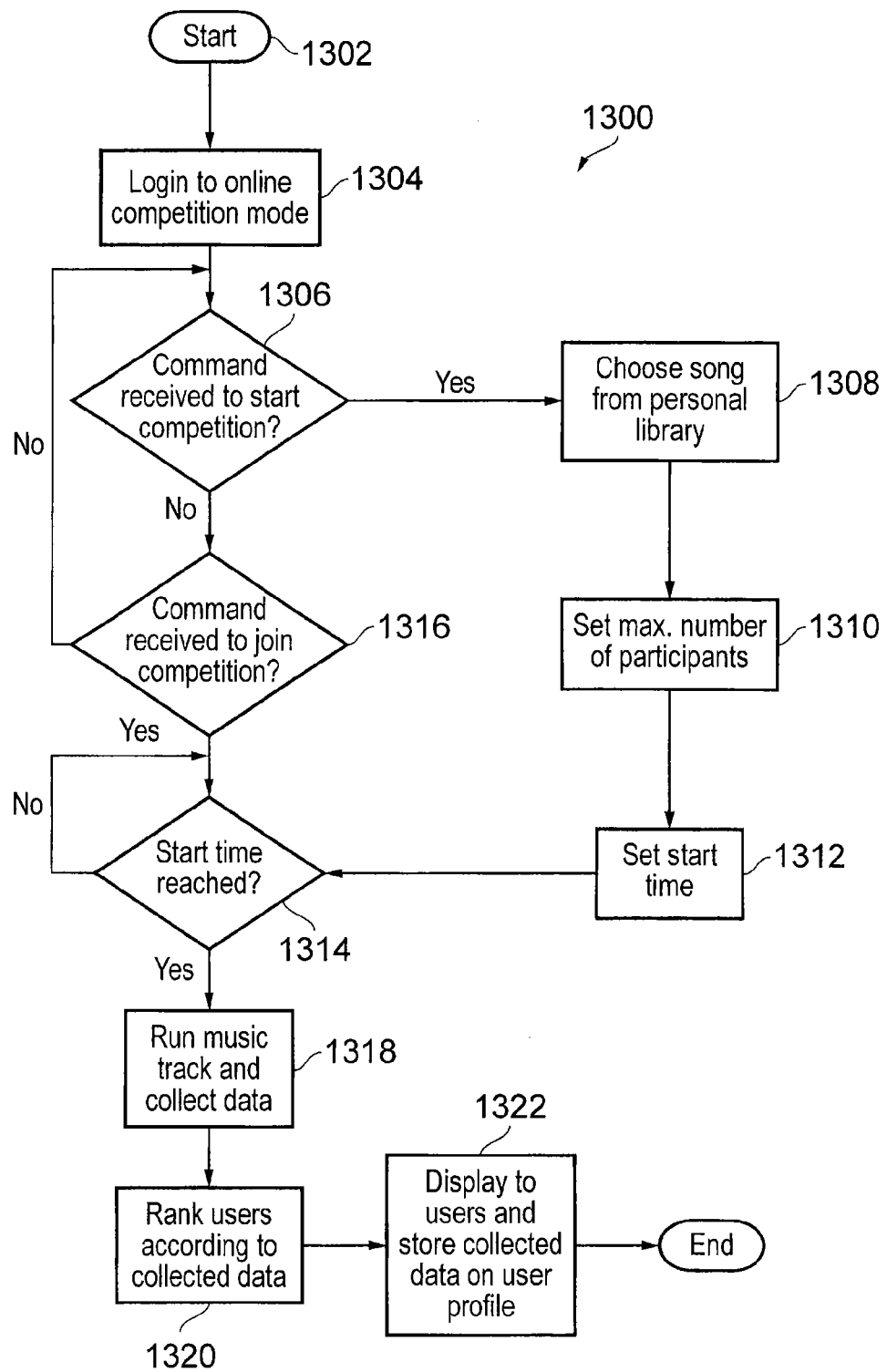
FIG. 13 shows a process by which a user may create or join online competitions, according to embodiments.

FIG. 13 shows a process 1300 by which a user may join a new competition or may create a new competition for a song of their choice, according to embodiments.

The process starts at step 1302. At step 1304, the user logs in to the an online competition mode. By logging in, the user enters a username and password (for example) which is authenticated by the server 1102. Once the user is logged in, they are free to join or create competitions.

The process then moves to step 1306, where it is determined whether or not a command has been received by the user to create a competition. If such a command has been received, then the process moves to step 1308. This marks the start of a competition creation process.

At step 1308, the user selects a song that is to be performed for the competition. This will be a song from the user's own song library. The user's song library is the collection of songs which have been previously purchased by the user. At step 1310, the user then sets the maximum number of participants. For example, the user may set the maximum number of participants as 2, 3 or 4 participants. At step 1312, the user then sets the start time of the competition. This is the start time 1212 that is displayed on the competition screen 1200 of the tablet. For example, the user may set the start time as 2, 3, 5 or 10 minutes. Once step 1312 has been completed, the process moves onto step 1314.

On the other hand, if no command is received by the tablet 100 to create a competition at step 1306, then it is determined at step 1316 as to whether or not a command has been received from the user to join an exiting competition. If a command has been received, then the process moves on to step 1314. Alternatively, if a command has not been received, then the process returns to step 1306, so as to once again check whether or not a command to create a competition has been issued.

At step 1314, a competition has either been joined by the user or has been created by the user. Here, it is thus determined as to whether or not the start time of the competition has elapsed (that is, has the incrementally decreasing start time reached zero). If the start time has not yet elapsed, then the check at step 1314 continually takes place until the start time has elapsed. Once the start time has elapsed, then the process moves onto step 1318.

At step 1318, the competition takes place. Here, correlation function data is taken for the performance of each of the users so as to create a correlation function for each user. In this case, a screen similar to the performance screen 928 is displayed to each of the users. However, since this is a competition, certain features of the performance screen will be disabled. In particular, the speed bar 936, progress bar 932 and song section indicator 934 functionality will be disabled, so that no user can adjust the speed of the song or skip the song (these parameters may, however, be chosen by the host of the competition as steps in addition to steps 1308, 1310 and 1312 when the competition is created).

Once the song has been completed, the process moves onto step 1320, where the correlation function for each of the users is analysed so as to create a total score for each user (similar to the total score 952 displayed on the results screen 942 in the previously described single player mode). The users are then ranked according to their total scores.

The process then moves onto step 1322, where the rankings are displayed to the users and the total score of each user is recorded to their respective online competition profile. By recording the total score of each user to their online competition profile, this information can be shared with other users for future competitions. So, for example, experienced users may be able to seek competitions hosted by other experienced users (who will have relatively high total score records), where as less experienced users may be able to seek competitions hosted by other less experienced users (who will have relatively low total score records). Advantageously, users can thus participate in competitions with other users with similar levels of ability.

It will be appreciated that although embodiments of the disclosure have been described as being implemented via software on a tablet computer 100, it will be appreciated that other suitable implementation methods of the disclosure are envisaged. For example, embodiments of the disclosure could be implemented in software on a mobile phone (such as a smartphone), a laptop or desktop computer, a smart TV, etc. In fact, embodiments of the disclosure may be implemented in any device which can run a correlation function engine 500 in software or hardware and which is able to generate sufficiently detailed image data ID and/or audio data AD and to receive force data FD from the finger tip sensors 102A-D.

Although described with reference to a tablet type computer, the disclosure should not be construed as being limited to this. For example, the user may wear a head mountable display such as glasses that include a heads-up display.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

CLAUSES

Features of the disclosure are provided in the following numbered paragraphs.
1. A method of providing feedback to a user of a string instrument, comprising the steps:
   detecting the force of a user's finger on at least one string at a given time;
   detecting the position of the user's finger on the at least one string at the given time;
   comparing the detected force of the user's finger and the position of the user's finger on the at least one string at the given time with a predetermined value of force and position at the given time; and
   generating feedback to display to the user on the basis of the said comparison.

2. A method according to clause 1 further comprising detecting the frequency of vibration on the user's finger at the given time, calculating the frequency spectrum of the vibration at the given time and determining the number of strings played by the user at the given time.

3. A method according to clause 1 or 2 further comprising receiving an image of the string instrument and determining the position of the user's finger on the string instrument from the received image.

4. A method according to clause 3, wherein the position of the user's finger is determined by performing edge detection on the received image.

5. A method according to clause 3 or 4, comprising performing image detection on the received image, wherein the position of the user's finger is determined by detecting a coloured finger sensor in the received image.

6. A method according to clause 1 to 5, comprising determining the difference between the detected force and the predetermined value of force at the given time and determining an error based on the determined differences over a predetermined time.

7. A method according to clause 1 to 6, comprising determining the difference between the detected force and the predetermined value of force at the given time, and determining when the difference exceeds a threshold over a predetermined period of time.

8. A device for providing feedback to a user of a string instrument, comprising:
   receiving circuitry operable in use to communicate with at least one finger sensor capable of detecting the force of a finger on a string, a camera operable in use to capture an image and a display operable in use to display data, wherein the receiving circuitry, camera and display are connected to processing circuitry which is operable to:
   detect, from the receiving circuitry, the force of a user's finger on at least one string at a given time;
   detect, from the camera, the position of the user's finger on the at least one string at the given time;
   compare the detected force of the user's finger and the position of the user's finger on the at least one string at the given time with a predetermined value of force and position at the given time; and
   generate, on the basis of the said comparison, feedback to display on the display.

9. A device according to clause 8 wherein the processing circuitry is further operable to detect, from the receiving circuitry, the frequency of vibration on the user's finger at the given time, and to calculate the frequency spectrum of the vibration at the given time and determining the number of strings played by the user at the given time.

10. A device according to clause 8 or 9 wherein the processing circuitry is further operable in use to receive an image of the string instrument from the camera, and from the received image is operable to determine the position of the user's finger on the string instrument.

11. A device according to clause 10, wherein the position of the user's finger is determined by performing edge detection on the received image.

12. A device according to clause 10 or 11, wherein the processing circuitry is further operable in use to perform image detection on the received image, wherein the position of the user's finger is determined by detecting a coloured finger sensor in the received image.

13. A device according to clause 8 to 12, wherein the processing circuitry is further operable in use to determine the difference between the detected force and the predetermined value of force at the given time and to determine an error based on the determined differences over a predetermined time.

14. A device according to clause 8 to 13, wherein the processing circuitry is further operable in use to determine the difference between the detected force and the predetermined value of force at the given time, and determine when the difference exceeds a threshold over a predetermined period of time.

15. A tablet device for providing feedback to a user of a string instrument, comprising:
   receiving circuitry operable in use to communicate with at least one finger sensor capable of detecting the force of a finger on a string, a camera operable in use to capture an image and a display operable in use to display data, wherein the receiving circuitry, camera and display are connected to processing circuitry which is operable to:
   detect, from the receiving circuitry, the force of a user's finger on at least one string at a given time;
   detect, from the camera, the position of the user's finger on the at least one string at the given time;
   compare the detected force of the user's finger and the position of the user's finger on the at least one string at the given time with a predetermined value of force and position at the given time; and
   generate, on the basis of the said comparison, feedback to display on the display.

16. Computer software comprising computer readable code which when loaded onto a computer configures the computer to perform a method according to clause 1 to 7.

17. A storage medium configured to store the computer software of claim 16 thereon or therein.

18. A method, device, tablet device or software as substantially hereinbefore described with reference to the accompanying drawings.

The invention claimed is:

1. A method of providing feedback to a user of a string instrument, comprising:
   detecting a force of a user's finger on at least one string at a given time;
   detecting a position of the user's finger on the at least one string at the given time;
   comparing the detected force of the user's finger and the position of the user's finger on the at least one string at the given time with at least two predetermined values of force and position at the given time; and
   generating feedback to display to the user on the basis of the said comparison.

2. The method according to claim 1, further comprising:
   detecting a frequency of vibration on the user's finger at the given time;
   calculating a frequency spectrum of the vibration at the given time; and
   determining a number of strings played by the user at the given time.

3. The method according to claim 1, further comprising:
   receiving an image of the string instrument and
   determining the position of the user's finger on the string instrument from the received image.

4. The method according to claim 3, wherein the position of the user's finger is determined by performing edge detection on the received image.

5. The method according to claim 3, further comprising:
   performing image detection on the received image, wherein the position of the user's finger is determined by detecting a colored finger sensor in the received image.

6. The method according to claim 1, further comprising:
   determining a difference between the detected force and at least one of the predetermined values of force at the given time; and
   determining an error based on the determined differences over a predetermined time.

7. The method according to claim 1, further comprising:
   determining a difference between the detected force and at least one of the predetermined values of force at the given time; and
   determining when the difference exceeds a threshold over a predetermined period of time.

8. A device for providing feedback to a user of a string instrument, comprising:
   receiving circuitry configured to communicate with at least one finger sensor capable of detecting a force of a finger on a string, a camera configured to capture an image and a display configured to display data, wherein the receiving circuitry, camera and display are connected to processing circuitry which is configured to:
   detect, from the receiving circuitry, the force of a user's finger on at least one string at a given time;
   detect, from the camera, a position of the user's finger on the at least one string at the given time;
   compare the detected force of the user's finger and the position of the user's finger on the at least one string at the given time with at least two predetermined values of force and position at the given time; and
   generate, on the basis of the said comparison, feedback to display on the display.

9. The device according to claim 8, wherein the processing circuitry is further configured to
   detect, from the receiving circuitry, a frequency of vibration on the user's finger at the given time;
   calculate a frequency spectrum of the vibration at the given time; and
   determine a number of strings played by the user at the given time.

10. The device according to claim 8, wherein the processing circuitry is further configured to
    receive an image of the string instrument from the camera; and
    determine the position of the user's finger on the string instrument from the received image.

11. The device according to claim 10, wherein the position of the user's finger is determined by performing edge detection on the received image.

12. The device according to claim 10, wherein the processing circuitry is further configured to perform image detection on the received image, and the position of the user's finger is determined by detecting a colored finger sensor in the received image.

13. The device according to claim 8, wherein the processing circuitry is further configured to
    determine a difference between the detected force and at least one of the predetermined values of force at the given time; and
    determine an error based on the determined differences over a predetermined time.

14. The device according to claim 8, wherein the processing circuitry is further configured to
    determine a difference between the detected force and at least one of the predetermined values of force at the given time; and
    determine when the difference exceeds a threshold over a predetermined period of time.

15. A tablet device for providing feedback to a user of a string instrument, comprising:
- receiving circuitry configured to communicate with at least one finger sensor capable of detecting a force of a finger on a string, a camera configured to operable in use to capture an image and a display configured to display data, wherein the receiving circuitry, camera and display are connected to processing circuitry which is configured to:
- detect, from the receiving circuitry, the force of a user's finger on at least one string at a given time;
- detect, from the camera, a position of the user's finger on the at least one string at the given time;
- compare the detected force of the user's finger and the position of the user's finger on the at least one string at the given time with at least two predetermined values of force and position at the given time; and
- generate, on the basis of the said comparison, feedback to display on the display.

16. Computer software comprising computer readable code which when loaded onto a computer configures the computer to perform the method according to claim 1.

17. A non-transitory storage medium configured to store the computer software of claim 16 thereon or therein.

* * * * *